US010795067B2

(12) United States Patent
Otsuka et al.

(10) Patent No.: US 10,795,067 B2
(45) Date of Patent: Oct. 6, 2020

(54) CONFOCAL OPTICAL SYSTEM-BASED MEASUREMENT APPARATUS AND METHOD FOR MANUFACTURING CONFOCAL OPTICAL SYSTEM-BASED MEASUREMENT APPARATUS

(71) Applicant: Otsuka Electronics Co., Ltd., Osaka (JP)

(72) Inventors: Haruka Otsuka, Hirakata (JP); Hisashi Shiraiwa, Hirataka (JP); Tsutomu Mizuguchi, Hirataka (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 16/369,219

(22) Filed: Mar. 29, 2019

(65) Prior Publication Data

US 2019/0331842 A1    Oct. 31, 2019

(30) Foreign Application Priority Data

Apr. 26, 2018 (JP) .................................. 2018-85662

(51) Int. Cl.
*G02B 6/00* (2006.01)
*F21V 8/00* (2006.01)
(Continued)

(52) U.S. Cl.
CPC .......... *G02B 6/0006* (2013.01); *G01J 3/0218* (2013.01); *G02B 6/04* (2013.01)

(58) Field of Classification Search
CPC ........ G02B 6/0006; G02B 6/04; G01J 3/0218
(Continued)

(56) References Cited

U.S. PATENT DOCUMENTS 9,891,105 B2    2/2018  Shiraiwa
2016/0352066 A1*  12/2016  Redding ........... H01S 3/094007
2017/0059407 A1*  3/2017  Shiraiwa ................... G01J 3/18

FOREIGN PATENT DOCUMENTS

JP       2017-049043 A    3/2017

* cited by examiner

*Primary Examiner* — Jerry M Blevins
(74) *Attorney, Agent, or Firm* — Studebaker & Brackett PC

(57) ABSTRACT

A confocal optical system-based measurement apparatus includes: a light source; a light projecting optical fiber group; a light receiving optical fiber group; a spectroscope; and a confocal optical system configured to condense each of a plurality of beams from a plurality of light projecting optical fibers to irradiate a sample therewith, and cause a plurality of beams from a plurality of condensing points on the sample to form images on the plurality of light receiving optical fibers, respectively, wherein the light projecting optical fiber group includes the plurality of light projecting optical fibers configured to receive light from the light source, the light receiving optical fiber group includes the plurality of light receiving optical fibers configured to guide received light to the spectroscope, the shape of an end face of the light projecting optical fiber group and the shape of an end face of the light receiving optical fiber group are in a mirror image relationship, and in the light projecting optical fiber group and the light receiving optical fiber group, the shape of an end face of each light projecting optical fiber and the shape of an end face of a light receiving optical fiber corresponding thereto are in a mirror image relationship.

5 Claims, 27 Drawing Sheets

(51) Int. Cl.
*G01J 3/02* (2006.01)
*G02B 6/04* (2006.01)

(58) Field of Classification Search
USPC .......................................................... 385/115
See application file for complete search history.

CONFOCAL OPTICAL SYSTEM-BASED MEASUREMENT APPARATUS AND METHOD FOR MANUFACTURING CONFOCAL OPTICAL SYSTEM-BASED MEASUREMENT APPARATUS

CROSS-REFERENCE TO RELATED APPLICATION

This application is based upon and claims the benefit of priority from Japanese patent application No. 2018-85662, filed on Apr. 26, 2018, the disclosure of which are incorporated herein in its entirety by reference.

BACKGROUND OF THE INVENTION

Field of the Invention

The present invention relates to a confocal optical system-based measurement apparatus and a method for manufacturing a confocal optical system-based measurement apparatus, and particularly relates to a confocal optical system-based measurement apparatus that splits light from a plurality of positions on a sample, and a method for manufacturing such a confocal optical system-based measurement apparatus.

Description of Related Art

In recent years, multifocal and confocal measurement apparatuses have been developed. For example, JP 2017-49043A (Patent Document 1) discloses the following configuration. That is to say a microspectroscope includes: a light source; a plurality of light projecting optical fibers configured to receive light from the light source; a spectroscope; a plurality of light receiving optical fibers configured to guide the received light to the spectroscope; and a confocal optical system configured to condense each of a plurality of beams from the plurality of light projecting optical fibers to irradiate a sample therewith, and cause a plurality of beams from a plurality of condensing points on the sample to form images on the plurality of light receiving optical fibers, respectively.

In a multifocal and confocal measurement apparatus, if condensing positions, at which beams from the condensing points on a sample are condensed, are significantly displaced from light receiving positions, at which the light receiving optical fibers receive light, there is the possibility that desirable measurement results cannot be obtained.

SUMMARY OF THE INVENTION

The present invention has been made to solve the above-described problem, and aims to provide, using a multifocal and confocal configuration, a confocal optical system-based measurement apparatus that can improve the accuracy of light receiving positions at which light from a sample is received, and a method for manufacturing such a confocal optical system-based measurement apparatus.

(1) A confocal optical system-based measurement apparatus according to one aspect of the present invention includes: a light source; a light projecting optical fiber group; a light receiving optical fiber group; a spectroscope; and a confocal optical system configured to condense each of a plurality of beams from a plurality of light projecting optical fibers to irradiate a sample therewith, and cause a plurality of beams from a plurality of condensing points on the sample to form images on the plurality of light receiving optical fibers, respectively wherein the light projecting optical fiber group includes the plurality of light projecting optical fibers configured to receive light from the light source, the light receiving optical fiber group includes the plurality of light receiving optical fibers configured to guide received light to the spectroscope, the shape of an end face of the light projecting optical fiber group and the shape of an end face of the light receiving optical fiber group are in a mirror image relationship, and in the light projecting optical fiber group and the light receiving optical fiber group, the shape of an end face of each light projecting optical fiber and the shape of an end face of a light receiving optical fiber corresponding thereto are in a mirror image relationship.

As described above, with a configuration in which the shape of an end face of the light projecting optical fiber group and the shape of an end face of the light receiving optical fiber group are in a mirror image relationship, and, in the light projecting optical fiber group and the light receiving optical fiber group, the shape of an end face of each light projecting optical fiber and the shape of an end face of a light receiving optical fiber corresponding thereto are in a mirror image relationship, it is possible to accurately match the condensing positions at which beams from the condensing points on the sample are condensed, with the light receiving positions at which the light receiving optical fibers receive light, using a simple configuration. Also, it is possible to suppress an increase in displacement due to an increase in the number of optical fibers. Therefore, it is possible to improve the accuracy of light receiving positions at which light from a sample is received, using a multifocal and confocal configuration.

(2) Preferably each light projecting optical fiber and each light receiving optical fiber include a core, a clad that covers the outer circumferential surface of the core, and a primary coating that covers the outer circumferential surface of the clad.

With such a configuration, it is possible to ensure higher strength compared to a configuration in which each light projecting optical fiber and each light receiving optical fiber do not include a primary coating, and save on costs for removing the primary coating.

(3) Preferably the light projecting optical fiber group further includes one or more light projecting-side dummy fibers, the light receiving optical fiber group further includes one or more light receiving-side dummy fibers, the one or more light projecting-side dummy fibers are located on the central side relative to at least one of the plurality of light projecting optical fibers in the end face of the light projecting optical fiber group, and the one or more light receiving-side dummy fibers are located on the central side relative to at least one of the plurality of light receiving optical fibers in the end face of the light receiving optical fiber group.

With such a configuration, it is possible to arrange the plurality of light projecting optical fibers and the plurality of light receiving optical fibers at any positions in the end face of the light projecting optical fiber group and the end face of the light receiving optical fiber group, respectively. As a result, it is possible to realize various irradiation positions according to the type or the like of a sample, while improving the accuracy of the light receiving positions at which light from the sample is received.

Also, even if the one or more light projecting-side dummy fibers and the one or more light receiving-side dummy fibers are located on the central side in the end face of the light projecting optical fiber group and the end face of the light receiving optical fiber group, with the configuration in which the shape of the end face of the light projecting optical fiber group and the shape of the end face of the light receiving optical fiber group are in a mirror image relationship, it possible to match the condensing positions at which beams from the condensing points on the sample are condensed, with the light receiving positions at which the light receiving optical fibers receive light.

(4) Preferably the light projecting optical fiber group further includes one or more light projecting marker optical fibers, the light receiving optical fiber group further includes one or more light receiving marker optical fibers, the confocal optical system condenses a marker beam from each light projecting marker optical fiber and a marker beam from each light receiving marker optical fiber to irradiate the sample therewith, and in the light projecting optical fiber group and the light receiving optical fiber group, the shape of an end face of each light projecting optical fiber and the shape of an end face of a light receiving optical fiber corresponding thereto are in a mirror image relationship.

With such a configuration, for example, by finding a relationship between condensing positions at which marker beams from the light projecting marker optical fibers are condensed and condensing positions at which marker beams from the light receiving marker optical fibers are condensed, and adjusting the relationship between the condensing positions at which beams from the condensing points on the sample are condensed, with the light receiving positions at which the light receiving optical fibers receive light, it is possible to keep the optical system in a desirable state.

Also, with a configuration in which, in the light projecting optical fiber group and the light receiving optical fiber group, the shape of an end face of each light projecting marker optical fiber and the shape of an end face of a light receiving marker optical fiber corresponding thereto are in a mirror image relationship, it is possible to easily match condensing positions at which beams from the light projecting marker optical fibers are condensed, with condensing positions at which beams from the light receiving marker optical fibers are condensed.

(5) A method according to one aspect of the present invention for manufacturing a confocal optical system-based measurement apparatus that includes: a light source; a plurality of light projecting optical fibers configured to receive light from the light source; a spectroscope; a plurality of light receiving optical fibers configured to guide received light to the spectroscope; and a confocal optical system configured to condense each of a plurality of beams from the plurality of light projecting optical fibers to irradiate a sample therewith, and cause a plurality of beams from a plurality of condensing points on the sample to form images on the plurality of light receiving optical fibers, respectively, the method includes: arranging optical fibers; cutting the optical fibers thus arranged, along a plane that is orthogonal to a direction in which the optical fibers extend, to divide the optical fibers into two optical fiber groups; and setting optical fibers included in one of the optical fiber groups as the light projecting optical fibers, and setting optical fibers included in the other of the optical fiber groups as the light receiving optical fibers.

With such a method, the shape of an end face of the light projecting optical fiber group and the shape of an end face of the light receiving optical fiber group are in a mirror image relationship, and, in the two optical fiber groups, the shape of an end face of each light projecting optical fiber and the shape of an end face of a light receiving optical fiber corresponding thereto are in a mirror image relationship. Therefore, it is possible to accurately match the condensing positions at which beams from the condensing points on the sample are condensed, with the light receiving positions at which the light receiving optical fibers receive light, using a simple configuration. Also, it is possible to prevent an increase in displacement due to an increase in the number of optical fibers. Therefore, it is possible to improve the accuracy of light receiving positions at which light from a sample is received, using a multifocal and confocal configuration.

According to the present invention, it is possible to improve the accuracy of light receiving positions at which light from a sample is received, using a multifocal and confocal configuration.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
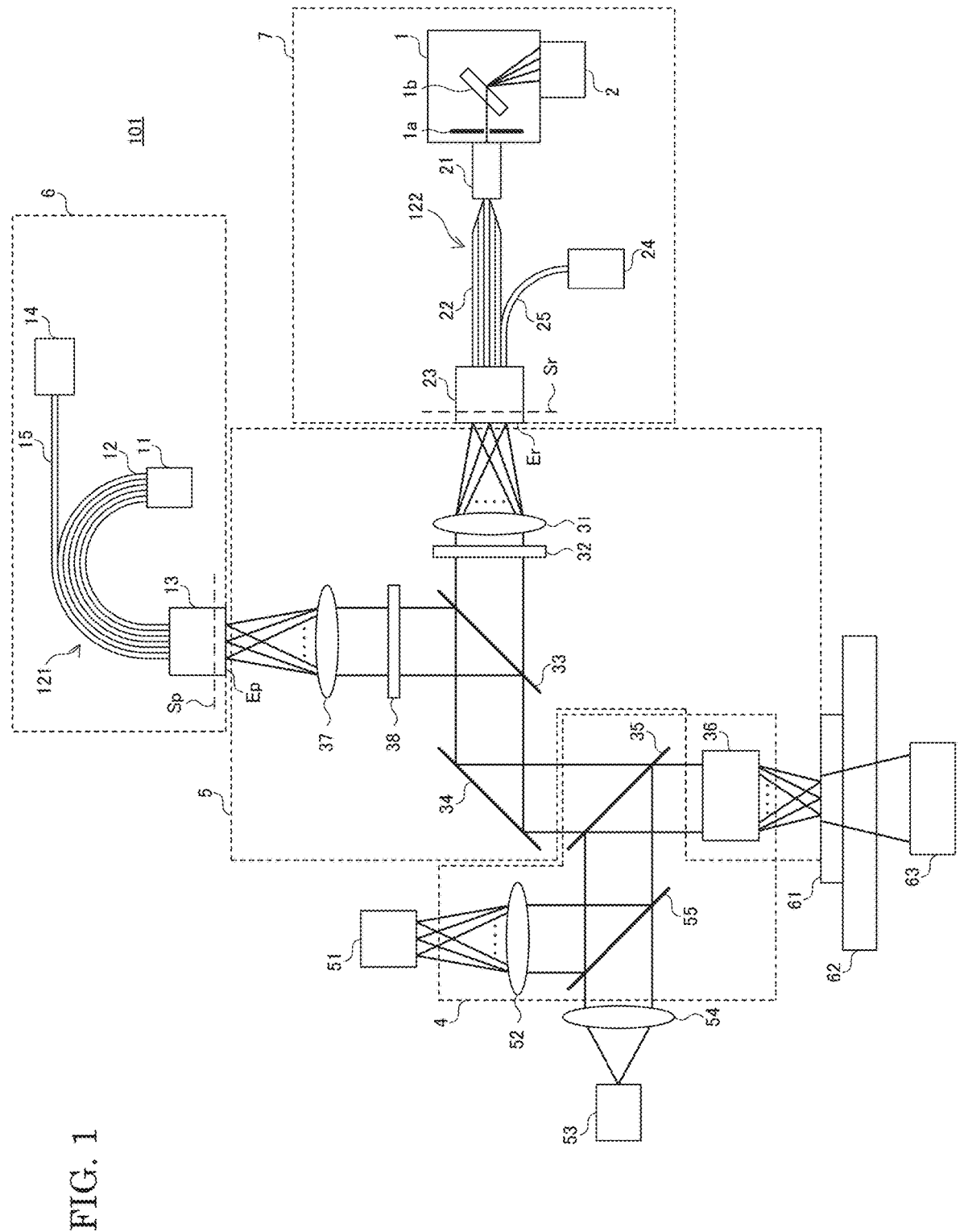
FIG. 1 shows a configuration of a confocal optical system-based measurement apparatus according to an embodiment of the present invention.

The following describes an embodiment of the present invention with reference to the drawings. Note that the same portions and equivalent portions in the drawings are assigned the same reference numerals and the descriptions thereof are not repeated. At least some portions of the embodiment below may be combined in any manner.

Configuration and Basic Operations

Overall Configuration

FIG. 1 shows a configuration of a confocal optical system-based measurement apparatus according to an embodiment of the present invention. The following describes a configuration and basic operations of a microspectroscope 101, which is an example of a confocal optical system-based measurement apparatus.

As shown in FIG. 1, the microspectroscope 101 includes an observation optical system 4, a confocal optical system 5, a light projecting portion 6, a light receiving portion 7, an observation camera 51, a reflection illuminator 53, a collimating lens 54, an XYZ stage 62, and a transmission illuminator 63.

The observation optical system 4 includes a movable half mirror 35, an object lens 36, an imaging lens 52, and a half mirror 55.

The light projecting portion 6 includes a measurement light source 11, a light projecting-side two-dimensional array fixing portion 13, a light projecting marker light source 14, and a light projecting optical fiber group 121. The light projecting optical fiber group 121 includes a plurality of light projecting optical fibers 12 and one or more light projecting marker optical fibers 15.

The light receiving portion 7 includes a spectroscope 1, a two-dimensional detector 2, a light receiving-side one-dimensional array fixing portion 21, a light receiving-side two-dimensional array fixing portion 23, a light receiving marker light source 24, and a light receiving optical fiber group 122. The light receiving optical fiber group 122 includes a plurality of light receiving optical fibers 22 and one or more light receiving marker optical fibers 25.

In this example, the light projecting portion 6 includes a light projecting optical fiber group 121 in which, for example, 23 light projecting optical fibers 12 and two light projecting marker optical fibers 15 are tied together. The light receiving portion 7 includes a light receiving optical fiber group 122 in which, for example, 23 light receiving optical fibers 22 and two light receiving marker optical fibers 25 are tied together.

The confocal optical system 5 includes a condensing lens 31, a band-stop filter 32, a dichroic mirror 33, a scanning mirror 34, the object lens 36, a collimating lens 37, and a band-pass filter 38.

Light Projecting Portion 6

The light projecting optical fibers 12 respectively have input ends facing the measurement light source 11 and output ends facing the collimating lens 3. The light projecting marker optical fibers 15 respectively have input ends facing the light projecting marker light source 14 and output ends facing the collimating lens 37.

The measurement light source 11 is, for example, a light source that generates light, and is specifically a laser that outputs light of a single color. The measurement light source 11 may be an LED (light-emitting diode) that outputs light having a wide bandwidth, an incandescent electric lamp, or the like.

The light projecting optical fibers 12 receive light from the measurement light source 11 on the input end side of the light projecting optical fibers 12, and transmit the received light to irradiate the collimating lens 37.

The light projecting marker light source 14 is, for example, an LED, an incandescent electric lamp, or the like. The light projecting marker light source 14 may be a laser.

The light projecting marker optical fibers 15 are fixed along the plurality of light projecting optical fibers 12, receive light from the light projecting marker light source 14, on the input end side of the light projecting marker optical fibers 15, and transmit the received light to irradiate the collimating lens 37.

Figure 2:
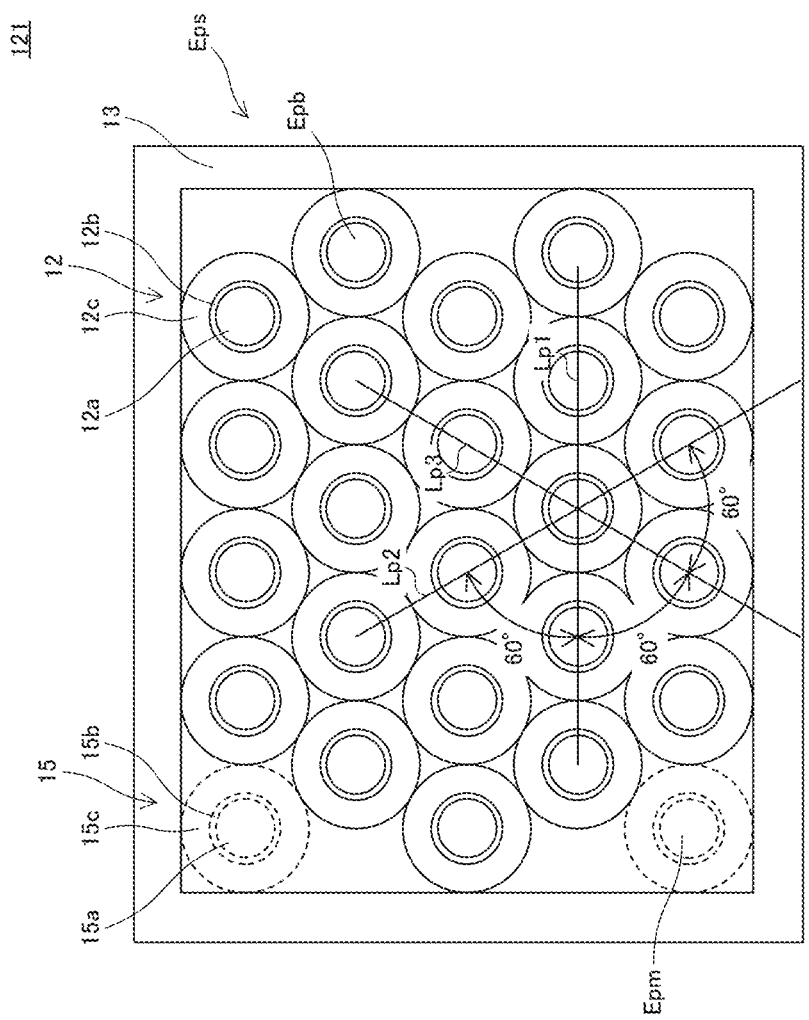
FIG. 2 is an example of an end face of a light projecting optical fiber group at a light projecting-side two-dimensional array fixing portion of the confocal optical system-based measurement apparatus according to an embodiment of the present invention.

FIG. 2 is an example of an end face of a light projecting optical fiber group at a light projecting-side two-dimensional array fixing portion of the confocal optical system-based measurement apparatus according to an embodiment of the present invention.

FIG. 2 is a plan view of an example of an end face Eps of the light projecting optical fiber group 121 in a direction toward end faces Epb of the output ends of the 23 light projecting optical fibers 12, and shows the end faces Epb and end faces Epm of the output ends of two light projecting marker optical fibers 15.

In this drawing, for easy distinction, the end faces Epb of the light projecting optical fibers 12 and the end faces Epm of the light projecting marker optical fibers 15 are respectively represented by solid lines and broken lines. Hereinafter, the end faces Epb and the end faces Epm are also referred to as "end faces".

As shown in FIG. 2, the light projecting optical fibers 12 and the light projecting marker optical fibers 15 in the light projecting portion 6 are, for example, aligned such that the end faces Ep are flush with each other in a plane that includes the end faces Ep and that is orthogonal to a direction in which the light projecting optical fibers 12 extend.

Furthermore, the cross-sections of the light projecting optical fibers 12 and the light projecting marker optical fibers 15 are, for example, in the shape of circles. Note that the cross-sections of the light projecting optical fibers 12 and the light projecting marker optical fibers 15 do not necessarily have to be in the shape of circles, and may be in the shape of polygons. The light projecting optical fibers 12 and the light projecting marker optical fibers 15 are, for example, individually two-dimensionally arranged.

Each light projecting optical fiber 12 includes a core 12a, a clad 12b, and a primary coating 12c. Each light projecting marker optical fiber 15 includes a core 15a, a clad 15b, and a primary coating 15c, The outer diameter of the primary coating 15c of each light projecting marker optical fiber 15 is the same as the outer diameter of the primary coating 12c of each light projecting optical fiber 12, for example.

Also, for example, in a plan view in a direction toward the end faces Ep, the light projecting optical fibers 12 and the light projecting marker optical fibers 15 are arranged closer to each other than in a state in which they are arranged in contact with each other in a square lattice.

Figure 3:
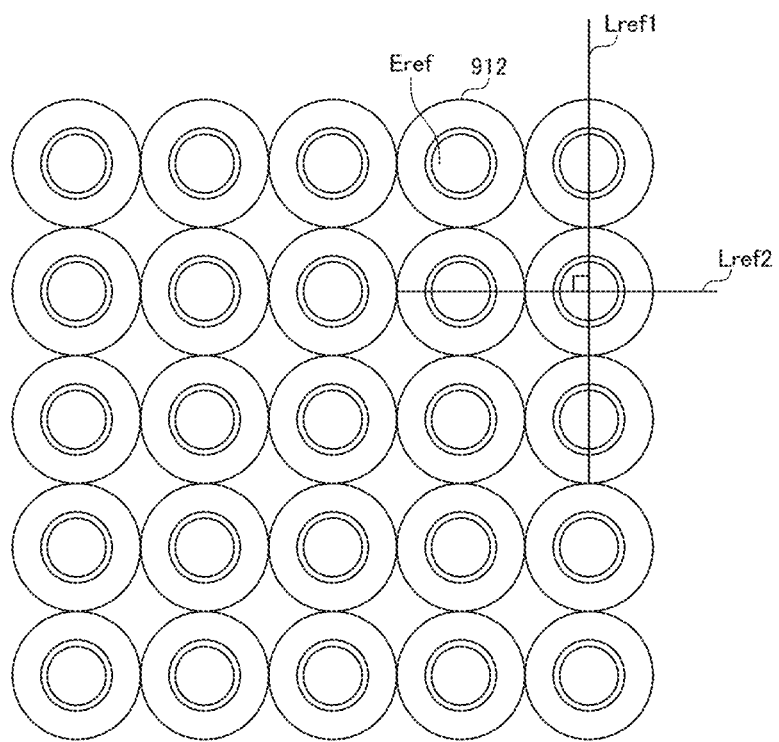
FIG. 3 is an example of a set of end faces of optical fibers according to a comparative example.

FIG. 3 is an example of a set of end faces of optical fibers according to a comparative example. FIG. 3 is a plan view in a direction toward end faces Eref of 25 optical fibers 912, showing the end faces Eref.

The optical fibers 912 are arranged in contact with each other in a square lattice. The state of being "arranged in a square lattice" refers to, for example, an arrangement as shown in FIG. 3 in which any optical fiber 912 is arranged in contact with other optical fibers 912 that are the closest to the optical fiber 912 and are arranged along a straight line Lref1 that extends through the center of the optical fiber 912, and with other optical fibers 912 that are the closest to the optical fiber 912 and are arranged along a straight line Lref2 that is orthogonal to the straight line Lref1 at the center of the optical fiber 912.

Again, as shown in FIG. 2, specifically for example, in a plan view in a direction toward the light projecting end face Eps, the light projecting optical fibers 12 and the light projecting marker optical fibers 15 are arranged in contact with each other in an equilateral triangle lattice, that is, they are arranged closest to each other. In other words, for example, in a plan view in a direction toward the light projecting end face Eps, the light projecting optical fibers 12 and the light projecting marker optical fibers 15 are arranged in contact with six other optical fibers.

The state of being "arranged in an equilateral triangle lattice" refers to, for example, an arrangement as shown in FIG. 2 in which any light projecting optical fiber 12 is arranged in contact with the closest other light projecting optical fibers 12 arranged along a straight line Lp1 that extends through the center of the light projecting optical fiber 12, with the closest other light projecting optical fibers 12 arranged along a straight line Lp2 that intersects the straight line Lp1 at 60 degrees at the center, and with the closest other light projecting optical fibers 12 arranged along a straight line Lp3 that intersects each of the straight lines Lp1 and Lp2 at 60 degrees at the center.

Although the light projecting optical fibers 12 and the light projecting marker optical fibers 15 in FIG. 2 are arranged in contact with each other in an equilateral triangle lattice in the light projecting end face Eps, the present invention is not limited to such a configuration. For example, a light projecting optical fiber 12 may be arranged in contact with other light projecting optical fibers 12 that are the closest to the light projecting optical fiber 12 and are arranged along a straight line that extends through the center of the light projecting optical fiber 12, and with other light projecting optical fibers 12 that are the closest to the light projecting optical fiber 12 and are arranged along a straight line that intersects the straight line at an angle smaller than 90° and larger than 60° at the center of the light projecting optical fiber 12.

As shown in FIG. 2, the light projecting-side two-dimensional array fixing portion 13 fixes the output end side of the light projecting optical fibers 12 and the light projecting marker optical fibers 15 by holding them together. More specifically, in the light projecting optical fiber group 121, the light projecting optical fibers 12 and the light projecting marker optical fibers 15 are piled up such that five layers each including five optical fibers are formed, and one optical fiber sits in the gap between the two optical fibers below, for example.

With the configuration in which each of the optical fibers is arranged in contact with six other fibers in this manner, the centers of the fibers can be stably fixed at the locations of the vertices of equilateral triangles, and thus the center positions of the fibers can be prevented from being displaced from their design positions.

Although a case was described in which the cross-sections of the light projecting optical fibers 12 and the light projecting marker optical fibers 15 are in the shape of circles, even in a case where the cross-sections of the fibers are in the shape of hexagons or the like, the fibers are arranged closer to each other than in a state where they are arranged in contact with each other in a square lattice, in the light projecting end face Eps.

Confocal Optical System 5

Again, as shown in FIG. 1, the confocal optical system 5 has a function of condensing a plurality of beams from the plurality of light projecting optical fibers 12 to irradiate a sample 61 therewith, and causing a plurality of beams from condensing points of the plurality of beams on the sample 61 to form images on the plurality of light receiving optical fibers 22, respectively.

More specifically the collimating lens 37 converts, for example, light spreading from the output ends of the light projecting optical fibers 12, into a projecting beam group consisting of beams that are substantially parallel with each other.

The band-pass filter 38 attenuates, for example, wavelength components of laser light contained in the projecting beam group from the collimating lens 37, other than those at peaks in spectra of the laser light.

The projecting beam group transmitted through the band-pass filter 38 is, for example, reflected by the dichroic mirror 33 and the scanning mirror 34, and is incident on the object lens 36.

The object lens 36 condenses, for example, each of a plurality of beams contained in the projecting beam group reflected by the scanning mirror 34, on the sample 61.

Figure 4:
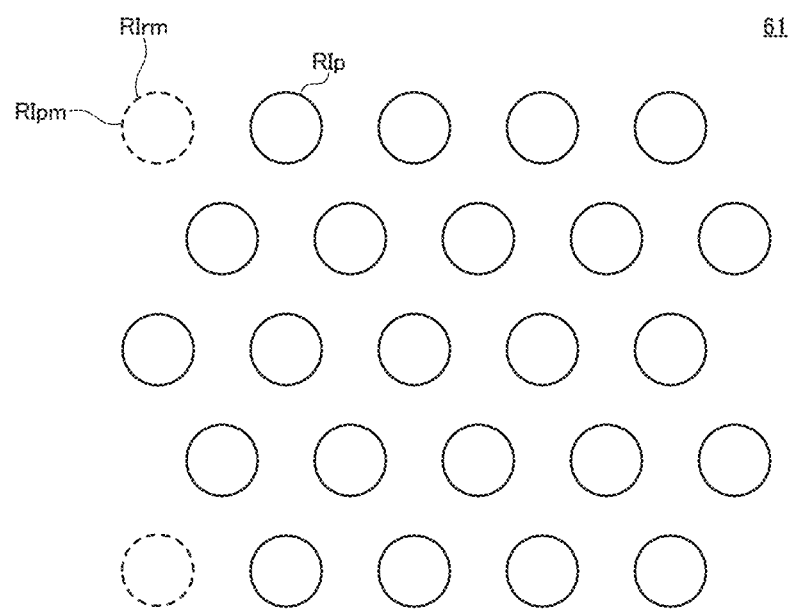
FIG. 4 shows an example of a set of real images formed on a sample in the confocal optical system-based measurement apparatus according to an embodiment of the present invention.

FIG. 4 shows an example of a set of real images formed on a sample in the confocal optical system-based measurement apparatus according to an embodiment of the present invention. In FIG. 4, real images RIp are represented by solid lines, and real images RIpm and real images RIrm are represented by broken lines.

As shown in FIG. 4, the real images RIp are, for example, real images of the output ends of the cores 12a of the 23 light projecting optical fibers 12, formed as a result of each of the beams from the output ends of the cores 12a being condensed on the sample 61 by the confocal optical system 5. The real images RIpm and the real images RIrm will be described later.

Again, as shown in FIG. 1, the object lens 36 converts, for example, light spreading from the real images RIp, into a receiving beam group consisting of beams that are substantially parallel with each other.

The scanning mirror 34 reflects, for example, the receiving beam group converted by the object lens 36.

The band-stop filter 32 attenuates, for example, wavelength components of light contained in the receiving beam group reflected by the scanning mirror 34, at peaks in spectra of the laser light of the measurement light source 11.

The condensing lens 31 condenses, for example, each of a plurality of beams contained in the receiving beam group transmitted through the band-stop filter 32.

Light Receiving Portion 7

The light receiving optical fibers 22 respectively have input ends facing the condensing lens 31 and output ends facing the spectroscope 1. The light receiving marker optical fibers 25 respectively have input ends facing the light receiving marker light source 24 and output ends facing the condensing lens 31.

The light receiving marker light source 24 is, for example, an LED, an incandescent electric lamp, or the like. The light receiving marker light source 24 may be a laser.

The light receiving marker optical fibers 25 are fixed along the plurality of light receiving optical fibers 22, receive light from the light receiving marker light source 24, on the input end side of the light receiving marker optical fibers 25, and transmit the received light to irradiate the condensing lens 31.

Figure 5:
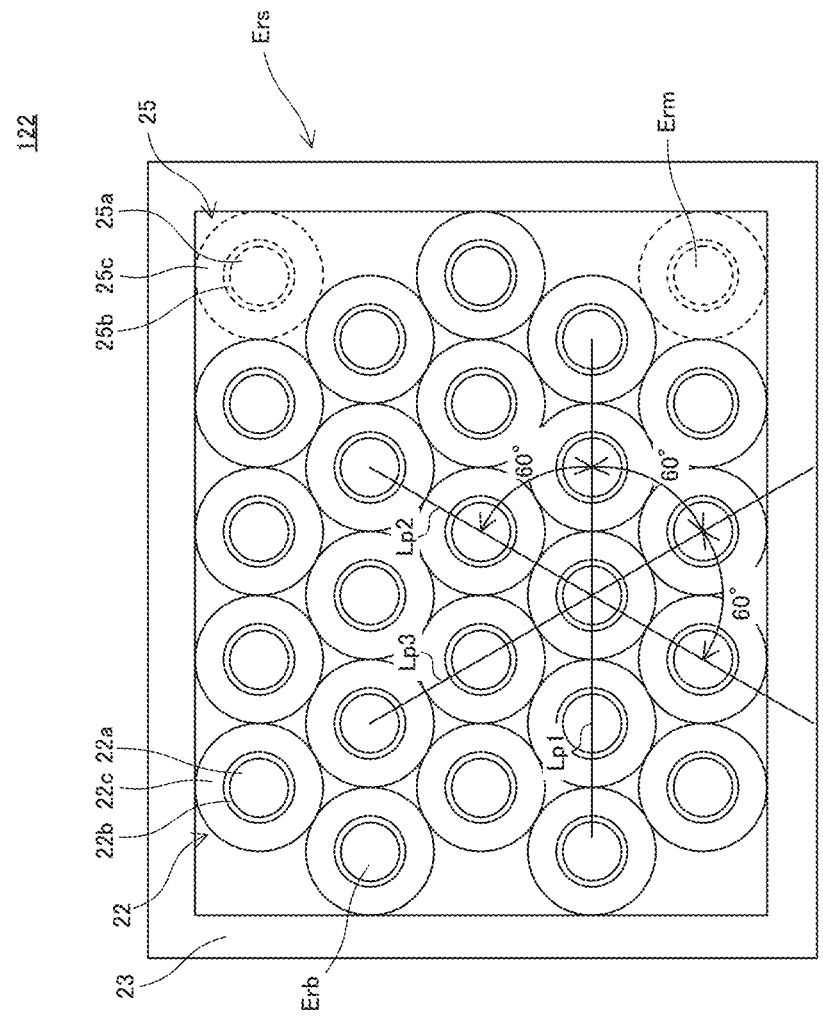
FIG. 5 is an example of an end face of a light receiving optical fiber group at a light receiving-side two-dimensional array fixing portion of the confocal optical system-based measurement apparatus according to an embodiment of the present invention.

FIG. 5 is an example of an end face of a light receiving optical fiber group at a light receiving-side two-dimensional array fixing portion of the confocal optical system-based measurement apparatus according to an embodiment of the present invention.

FIG. 5 is a plan view of an example of an end face Ers of the light receiving optical fiber group 122 in a direction toward end faces Erb of the input ends of the 23 light receiving optical fibers 22, and shows the end faces Erb and end faces Erm of the output ends of two light receiving marker optical fibers 25.

In this drawing, for easy distinction, the end faces Erb of the light receiving optical fibers 22 and the end faces Erm of the light receiving marker optical fibers 25 are respectively represented by solid lines and broken lines. Hereinafter, the end faces Erb and the end faces Erm are also referred to as "end faces Er".

As shown in FIG. 5, the light receiving optical fibers 22 and the light receiving marker optical fibers 25 in the light receiving portion 7 are, for example, aligned such that the end faces Er are flush with each other in a plane that includes the end faces Er and that is orthogonal to a direction in which the light receiving optical fibers 22 extend.

Furthermore, the cross-sections of the light receiving optical fibers 22 and the light receiving marker optical fibers 25 are, for example, in the shape of circles. Note that the cross-sections of the light receiving optical fibers 22 and the light receiving marker optical fibers 25 do not necessarily have to be in the shape of circles, and may be in the shape of polygons. The light receiving optical fibers 22 and the light receiving marker optical fibers 25 are, for example, individually two-dimensionally arranged.

The input ends of cores 22a of the light receiving optical fibers 22 are arranged at positions that are respectively conjugate with the real images RIp shown in FIG. 4. That is to say; the output ends of the cores 12a of the light projecting optical fibers 12 in the light projecting end face Eps shown in FIG. 2 and the input ends of the cores 22a of the light receiving optical fibers 22 in the light receiving end face Ers shown in FIG. 5 optically correspond to each other via the confocal optical system 5 shown in FIG. 1.

The light receiving-side two-dimensional array fixing portion 23 fixes the output end side of the light receiving optical fibers 22 and the light receiving marker optical fibers 25 by holding them together. More specifically in the light receiving optical fiber group 122, the light receiving optical fibers 22 and the light receiving marker optical fibers 25 are piled up such that five layers each including five optical fibers are formed, and one optical fiber sits in the gap between the two optical fibers below, for example, as with the light projecting optical fibers 12 and the light projecting marker optical fibers 15 shown in FIG. 2.

Although the cross-sections of the light receiving optical fibers 22 and the light receiving marker optical fibers 25 described above are in the shape of circles, even if the cross-sections of the light receiving optical fibers 22 and the light receiving marker optical fibers 25 described above are in the shape of hexagons, for example, in the light receiving end face Ers, the light receiving optical fibers 22 and the light receiving marker optical fibers 25 are arranged closer to each other than in a state in which they are arranged in contact with each other in a square lattice.

Again, as shown in FIG. 1, the light receiving optical fibers 22 have a function of guiding the received light to the spectroscope 1. More specifically, the light receiving optical fibers 22 cause, for example, the receiving beam group received at their input ends to be converted into a plurality of one-dimensionally arranged beams (hereinafter, also referred to as a one-dimensional beam group) and to be incident on the spectroscope 1.

More specifically, for example, the light receiving-side one-dimensional array fixing portion 21 one-dimensionally fixes the output ends of the light receiving optical fibers 22 whose input ends are two-dimensionally arranged in the light receiving-side two-dimensional array fixing portion 23.

The spectroscope 1 includes a slit 1a and a diffraction grating 1b. The opening portion of the slit 1a is arranged, for example, so as to face the one-dimensional beam group and to be along a direction that is parallel to the arrangement direction of the one-dimensional beam group.

The plurality of beams contained in the one-dimensional beam group that have passed through the slit 1a are, for example, diffracted by the diffraction grating 1b into a direction that is orthogonal to the arrangement direction, and are irradiated onto the two-dimensional detector 2.

The two-dimensional detector 2 measures, for example, intensity at each wavelength, i.e. a spectrum, for each beam contained in the one-dimensional beam group diffracted by the diffraction grating 1b. That is to say, the two-dimensional detector 2 measures, for each of the positions of the real images RIp shown in FIG. 4, a spectrum on the sample 61 irradiated with light that has traveled via the light projecting optical fiber 12 corresponding thereto, for example.

For example, in the configuration in which a light source that emits light having a single color such as a laser is used as the measurement light source 11, the microspectroscope 101 can be used as a confocal Raman spectroscopic microscope that can simultaneously measure Raman spectra at multiple points, or a confocal spectroscopic microscope that can simultaneously measure fluorescence spectra at multiple points.

Furthermore, for example, in the configuration in which a light source that emits light having a wide bandwidth such as a white light source is used as the measurement light source 11, the microspectroscope 101 can be used as a confocal spectral reflection microscope that can simultaneously measure spectral reflection spectra at multiple points.

Description of Problems

It can be envisaged that, in the multifocal and confocal microspectroscope 101, the central position of each light projecting optical fiber 12 in the light projecting end face Eps of the light projecting optical fiber group 121 and the central position of the light receiving optical fiber 22 corresponding thereto in the light receiving end face Ers of the light receiving optical fiber group 122 are displaced from each other due to variations in the outer diameter of the light projecting optical fibers 12 and variations in the outer diameter of the light receiving optical fibers 22. That is, it can be envisaged that the condensing positions at which beams from the condensing points on the sample 61 are condensed do not accurately match the central positions of the cores 22a of the light receiving optical fibers 22.

Therefore, it is possible to employ a method by which the optical system is provided with a pinhole array. However, with this method, there is a problem in that manufacturing costs or the like increase.

It is also possible to form the cores 22a of the light receiving optical fibers 22 so as to have a diameter that is larger than the diameter of the cores 12a of the light projecting optical fibers 12, and thus secure a margin for the displacement of the condensing positions at which beams from the condensing points on the sample 61 are condensed and the central positions of the cores 22a of the light receiving optical fibers 22.

However, the displacement increases as the number of optical fibers increases, and even if the cores 22a are formed so as to have a diameter that is larger than the diameter of the cores 12a, it may be impossible to secure a sufficient margin for the displacement.

Therefore, an embodiment of the present invention employs the following configuration to solve the above-described problems.

Configuration of Light Receiving End Face

As shown in FIGS. 2 and 5, the shape of the light projecting end face Eps and the shape of the light receiving end face Ers are in a mirror image relationship. A mirror image relationship is a relationship in which one end face of two end faces corresponding to each other coincides with the other end face when it is inverted, or a relationship in which the two end faces corresponding to each other are symmetrical with respect to a line in a plane.

Also, in the light projecting optical fiber group 121 and the light receiving optical fiber group 122, the shape of the end face Epb of each light projecting optical fiber 12 and the shape of the end face Erb of the light receiving optical fiber 22 corresponding thereto are in a mirror image relationship. Here, for example, the shape of the end face Epb of each light projecting optical fiber 12 and the shape of the end face Erb of the light receiving optical fiber 22 corresponding thereto are the same.

Also, in the light projecting optical fiber group 121 and the light receiving optical fiber group 122, the shape of the end face Epm of each light projecting marker optical fiber 15 and the shape of the end face Erm of the light receiving marker optical fiber 25 corresponding thereto are in a mirror image relationship. Here, for example, the shape of the end face Epm of each light projecting marker optical fiber 15 and the shape of the end face Erm of the light receiving marker optical fiber 25 corresponding thereto are the same.

Each light receiving optical fiber 22 includes a core 22a, a clad 22b, and a primary coating 22c. For example, the outer diameter of the primary coating 22c of each light receiving optical fiber 22 is the same as the outer diameter of the primary coating 12c of each light projecting optical fiber 12.

Each Light receiving marker optical fiber 25 includes a core 25a, a clad 25b, and a primary coating 25c. For example, the outer diameter of the primary coating 25c of each light receiving marker optical fiber 25 is the same as the outer diameter of the primary coating 22c of each light receiving optical fiber 22 and the outer diameter of the primary coating 12c of each light projecting optical fiber 12.

In the light projecting optical fiber group 121 and the light receiving optical fiber group 122, the shape of the core 12a, the shape of the clad 12b, and the shape of the primary coating 12c of each light projecting optical fiber 12 and the shape of the core 22a, the shape of the clad 22b, and the shape of the primary coating 22c of the light receiving optical fiber 22 corresponding thereto are respectively in a mirror image relationship.

Also, in the light projecting optical fiber group 121 and the light receiving optical fiber group 122, the shape of the core 15a, the shape of the clad 15b, and the shape of the primary coating 15c of each light projecting marker optical fiber 15 and the shape of the core 25a, the shape of the clad 25b, and the shape of the primary coating 25c of the light receiving marker optical fiber 25 corresponding thereto are respectively in a mirror image relationship.

For example, in a plan view in a direction toward the end faces Erb of the light receiving optical fibers 22, the light receiving optical fibers 22 and the light receiving marker optical fibers 25 are arranged closer to each other than in a state in which they are arranged in contact with each other in a square lattice.

Specifically for example, in a plan view in a direction toward the light receiving end face Ers, the light receiving optical fibers 22 and the light receiving marker optical fibers 25 are arranged in contact with each other in an equilateral triangle lattice, that is, they are arranged closest to each other. In other words, for example, in a plan view in a direction toward the light receiving end face Ers, the light receiving optical fibers 22 and the light receiving marker optical fibers 25 are arranged in contact with six other optical fibers.

Although the light receiving optical fibers 22 and the light receiving marker optical fibers 25 in FIG. 5 are arranged in contact with each other in an equilateral triangle lattice in the light receiving end face Ers, the present invention is not limited to such a configuration. For example, a light receiving optical fiber 22 may be arranged in contact with other light receiving optical fibers 22 that are the closest to the optical fiber 22 and are arranged along a straight line that extends through the center of the light receiving optical fiber 22, and with other light receiving optical fibers 22 that are the closest to the light receiving optical fiber 22 and are arranged along a straight line that intersects the straight line at an angle smaller than 90° and larger than 60° at the center of the light receiving optical fiber 22.

Light Projecting Marker Optical Fibers 15 and Light Receiving Marker Optical Fibers 25

For example, the confocal optical system 5 condenses marker beams from the light projecting marker optical fibers 15 and marker beams from the light receiving marker optical fibers 25 to irradiate the sample 61 therewith.

More specifically, the collimating lens 37 converts, for example, light spreading from the output ends of the light projecting marker optical fibers 15, into a light projecting marker beam group consisting of substantially parallel beams.

The band-pass filter 38 attenuates, for example, wavelength components of light contained in the light projecting marker beam group from the collimating lens 37, other than those at peaks in spectra of the laser light of the measurement light source 11 and the light projecting marker light source 14.

The light projecting marker beam group transmitted through the band-pass filter 38 is, for example, reflected by the dichroic mirror 33 and the scanning mirror 34, and is incident on the object lens 36.

The object lens 36 condenses, for example, a plurality of beams contained in the light projecting marker beam group reflected by the scanning mirror 34, on the sample 61.

Furthermore, the condensing lens 31 converts, for example, light spreading from the output ends of the light receiving marker optical fibers 25, into a light receiving marker beam group consisting of substantially parallel beams.

For example, wavelength components of light contained in the light receiving marker beam group from the condensing lens 31 are transmitted through the band-stop filter 32.

The light receiving marker beam group transmitted through the band-stop filter 32 is, for example, reflected by the scanning mirror 34, and is incident on the object lens 36.

The object lens 36 condenses, for example, a plurality of beams contained in the light receiving marker beam group reflected by the scanning mirror 34, on the sample 61.

Again, as shown in FIG. 4, the real images RIpm are, for example, real images of the output ends of the cores 15a of the two light projecting marker optical fibers 15, formed as a result of light from the output ends of the cores 15a being condensed on the sample 61 by the confocal optical system 5.

Furthermore, the real images RIrm, are, for example, real images of the output ends of the cores 25a of the two light receiving marker optical fibers 25, formed as a result of light from the output ends of the cores 25a being condensed on the sample 61 by the confocal optical system 5.

XYZ Stage 62, Transmission Illuminator 63, Observation Camera 51 and Reflection Illuminator 53

Again, as shown in FIG. 1, the XYZ stage 62 can move, for example, in a direction that is perpendicular to the optical axis of the object lens 36 (hereinafter, also referred to as a lateral direction) and in a direction that is parallel to the optical axis (hereinafter, also referred to as a vertical direction). The sample 61 is, for example, placed on the XYZ stage 62, and is scanned in the lateral direction by moving the XYZ stage 62 in the lateral direction.

Furthermore, the scanning mirror 34 can rotate about rotational axes, for example, consisting of two axes that extend through the center of the mirror, that are contained on the mirror face, and that are orthogonal to each other. The positions at which beams contained in the projecting beam group are condensed on the sample 61 are scanned in the lateral direction, for example, by changing the reflection direction of the beams by rotating the scanning mirror 34 about the rotational axes consisting of the two axes.

For example, when observing the sample 61 in a reflection mode, the reflection illuminator 53 irradiates light onto the sample 61 from the object lens 36 side. More specifically the movable half mirror 35 reflects, for example, beams emitted from the reflection illuminator 53 and collimated by the collimating lens 54, thereby guiding the beams via the object lens 36 to irradiate the sample 61.

Furthermore, for example, when observing the sample 61 in a transmission mode, the transmission illuminator 63 irradiates light onto the sample 61 from the side that is farther from the object lens 36 than the sample 61 is.

Observation Optical System 4

The observation optical system 4 condenses, for example, each of beams from the condensing points on the sample 61, on the observation camera 51.

More specifically the object lens 36 in the observation optical system 4 collimates, for example, light spread apart from the sample 61. The movable half mirror 35 and the half mirror 55 reflect, for example, light collimated by the object lens 36.

The imaging lens 52 condenses, for example, light reflected by the half mirror 55, on the observation camera 51.

For example, the observation camera. 51 generates an image containing the real images RIp, RIrm, and RIpm on the sample 61 based on the light from the sample 61 condensed by the observation optical system 4.

For example, the measurer can see positions in the lateral direction and the vertical direction of the real images RIp, RIrm, and RIpm on the sample 61 based on the image generated by the observation camera 51. The measurer adjusts, for example, the positions in the lateral direction of the real images RIp, RIrm, and RIpm on the sample 61, as necessary by laterally moving the XYZ stage 62 or rotating the scanning mirror 34.

Furthermore, the measurer adjusts, for example, the positions in the vertical direction of the real images RIp, RIrm, and RIpm on the sample 61, as necessary, by vertically moving the XYZ stage 62. Note that the measurer may perform the adjustment by vertically moving the object lens 36 instead of vertically moving the XYZ stage 62.

Furthermore, the measurer can see, for example, a positional relationship between the real images RIpm and RIrm on the sample 61 based on the image.

In this case, a marker positional relationship, which is a positional relationship between the centers of the real images RIpm and the centers of the real images RIrm, corresponds to, for example, a relationship between the center positions of the input ends of the cores 22a of the light receiving optical fibers 22 and the condensing positions of light from the centers of the real images RIp on the input ends.

For example, if the real images RIpm and the corresponding real images RIrm match each other as shown in FIG. 4, light from the centers of the corresponding real images RIp is condensed on the centers of the input ends of the cores 22a of the light receiving optical fibers 22. That is to say, the cores 22a of the light receiving optical fibers 22 can suitably receive light respectively from the real images RIp.

The measurer sees, for example, whether or not the input ends of the cores 22a of the light receiving optical fibers 22 suitably receive light respectively from the real images RIp, based on the marker positional relationship.

If the real images RIpm and the corresponding real images RIrm are displaced from each other, for example, the measurer adjusts the positions and the orientations of the optical elements in the confocal optical system 5, the light projecting-side two-dimensional array fixing portion 13, and the light receiving-side two-dimensional array fixing portion 23 such that the real images RIpm and the corresponding real images RIrm match each other, thereby enabling the input ends of the cores 22a of the light receiving optical fibers 22 to suitably receive Light respectively from the real images RIp.

Also, as described above, in the light projecting optical fiber group 121 and the light receiving optical fiber group 122, the shape of the core 15a of the light projecting marker optical fiber 15 and the shape of the core 25a of the light receiving marker optical fiber 25 corresponding thereto are in a mirror image relationship. As a result, it is possible to easily match the real image RIpm with the real image RIrm.

For example, the light projecting marker light source 14 and the light receiving marker light source 24 output light having mutually different colors. Specifically for example, if the measurement light source 11 is a laser light source that emits green light, the light projecting marker light source 14 and the light receiving marker light source 24 respectively output green light and red light.

Accordingly, the color of the real images RIpm and the color of the real images RIrm can be respectively set to green and red, so that the measurer can more reliably distinguish the real images RIpm from the real images RIrm.

Furthermore, the color of each portion where the region of a real image RIpm and the region of a real image RIrm overlap each other becomes yellow, which is a color obtained by additive mixture of green and red, and thus, based on a positional relationship between the red real image RIrm and the yellow overlap portion, the measurer can clearly see displacement between the center of the real image RIpm and the center of the corresponding real image RIrm.

When performing measurement using the spectroscope 1, for example, the movable half mirror 35 moves to a position withdrawn from the optical path of the projecting beam group.

Examples of Real Images RIpm and Real Images RIrm

Figure 6:
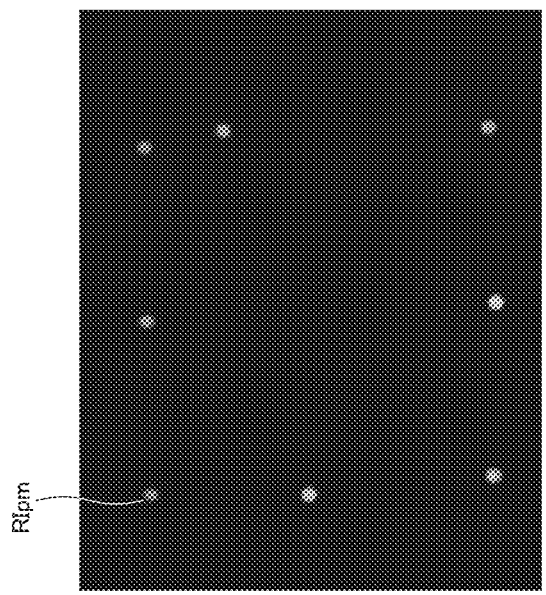
FIG. 6 is an image showing an example of a set of real images formed by light from light projecting marker optical fibers, on a sample in the confocal optical system-based measurement apparatus according to an embodiment of the present invention.

FIG. 6 is an image showing an example of a set of real images formed by light from light projecting marker optical fibers, on a sample in the confocal optical system-based measurement apparatus according to an embodiment of the present invention.

FIG. 6 shows real images RIpm formed on the sample 61 by light from the light projecting marker optical fibers 15 when the light projecting portion 6 includes eight light projecting marker optical fibers 15.

Figure 7:
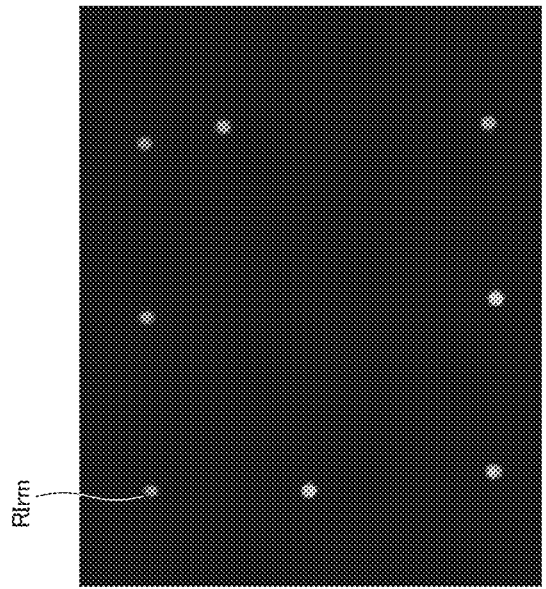
FIG. 7 is an image showing an example of a set of real images formed by light from light receiving marker optical fibers, on a sample in the confocal optical system-based measurement apparatus according to an embodiment of the present invention.

FIG. 7 is an image showing an example of a set of real images formed by light from light receiving marker optical fibers, on a sample in the confocal optical system-based measurement apparatus according to an embodiment of the present invention.

FIG. 7 shows real images RIrm formed on the sample 61 by light from the light receiving marker optical fibers 25 when the light receiving portion 7 includes eight light receiving marker optical fibers 25.

Figure 8:
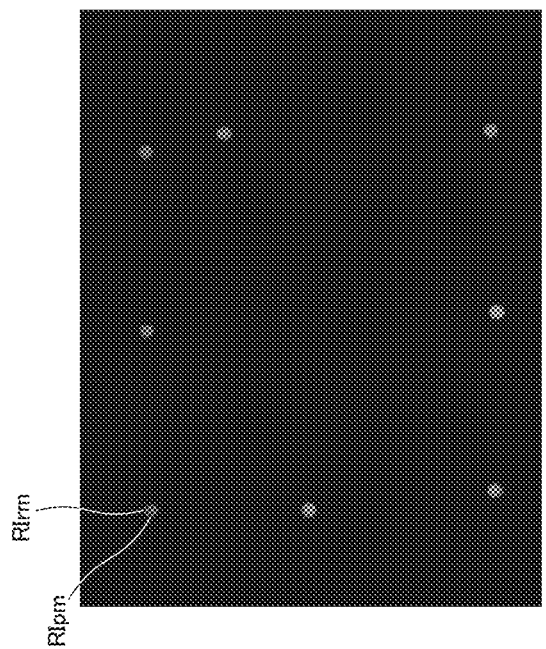
FIG. 8 is an image showing an example of positioning of real images RIpm and real images RIrm formed on a sample by the confocal optical system-based measurement apparatus according to an embodiment of the present invention.

FIG. 8 is an image showing an example of positioning of real images RIpm and real images formed on a sample by the confocal optical system-based measurement apparatus according to an embodiment of the present invention.

As shown in FIG. 8, a measurer adjusts the positions and orientations of the optical elements in the confocal optical system 5, the light projecting-side two-dimensional array fixing portion 13, and the light receiving-side two-dimensional array fixing portion 23 such that the positions of the real images RIpm shown in FIG. 6 match the positions of the real images RIrm corresponding thereto shown in FIG. 7.

Manufacturing Method

Figure 9:
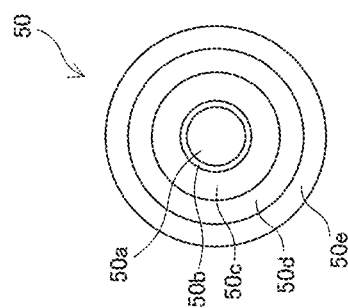
FIG. 9 shows au example of a configuration of an optical fiber used for manufacturing the confocal optical system-based measurement apparatus according to an embodiment of the present invention.

Optical Fibers Used for Manufacturing Confocal Optical System-Based Measurement Apparatus FIG. 9 shows an example of a configuration of an optical fiber used for manufacturing the confocal optical system-based measurement apparatus according to an embodiment of the present invention. FIG. 9 shows a cross section of an optical fiber 50 along a plane that is orthogonal to a direction in which the optical fiber 50 extends.

As shown in FIG. 9, the optical fiber 50 includes a core 50a at the center, a clad 50b that covers the outer circumferential surface of the core 50a, a primary coating 50c that covers the outer circumferential surface of the clad 50b, a buffer 50d that covers the outer circumferential surface of the primary coating 50c, and a secondary coating 50e that covers the buffer 50d, which are concentrically layered in the stated order in a radial direction from the central side to the outer side.

For example, when the microspectroscope 101 is to be manufactured, a plurality of optical fibers 50 are arranged in a state where the buffers 50d and the secondary coatings 50e have been removed, as shown in FIGS. 2 and 5.

When an optical fiber 50 is used as a light projecting optical fiber 12, the core 50a, the clad 50b, and the primary coating 50c of the optical fiber 50 respectively serve as the core 12a, the clad 12b, and the primary coating 12c shown in FIG. 2. When an optical fiber 50 is used as a light projecting marker optical fiber 15, the core 50a, the clad 50b, and the primary coating 50c of the optical fiber 50 respectively serve as the core 15a, the clad 15b, and the primary coating 15c shown in FIG. 2.

When an optical fiber 50 is used as a light receiving optical fiber 22, the core 50a, the clad 50b, and the primary coating 50c of the optical fiber 50 respectively serve as the core 22a, the clad 22b, and the primary coating 22c shown in FIG. 5. When an optical fiber 50 is used as a light receiving marker optical fiber 25, the core 50a, the clad 50b, and the primary coating 50c of the optical fiber 50 respectively serve as the core 25a, the clad 25b, and the primary coating 25c shown in FIG. 5.

As shown in FIGS. 2 and 5, when the microspectroscope 101 is to be manufactured, with a configuration in which the optical fibers 50 are arranged in such a state that each optical fiber 50 includes a primary coating 50c, it is possible to ensure higher strength compared to a configuration in which the optical fibers 50 are arranged in such a state that the primary coatings 50c have been removed from the optical fibers 50, and save on costs for removing the primary coating 50c.

Also, as described above, in the light projecting optical fiber group 121 and the light receiving optical fiber group 122, the shape of the primary coating 50c of each optical fiber 50 included in the light projecting optical fiber group 121 and the shape of the primary coating 50c of the optical fiber 50 corresponding thereto included in the light receiving optical fiber group 122 are in a mirror image relationship. As a result, even if the optical fibers 50 are arranged in such a state that each optical fiber 50 includes a primary coating 50c, it is possible to accurately match the condensing positions at which beams from the condensing points on the sample 61 are condensed, with the central positions of the cores 22a of the light receiving optical fibers 22.

Note that, when the microspectroscope 101 is to be manufactured, the optical fibers 50 may be arranged in such a state that the primary coating 50c, the buffer 50d, and the secondary coating 50e have been removed from each optical fiber 50.

Procedures of Manufacturing Method

Figure 10:
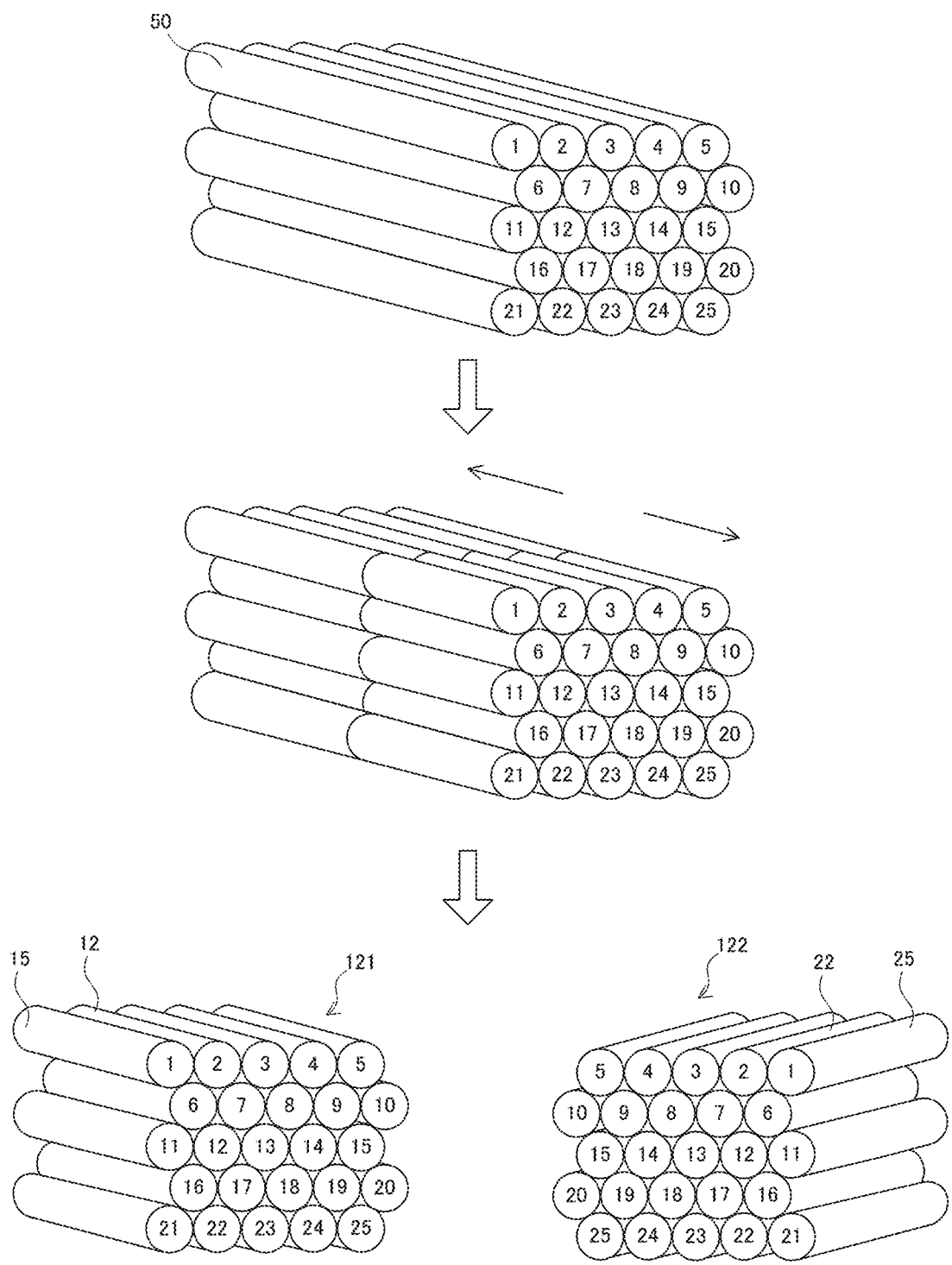
FIG. 10 illustrates a method for manufacturing a light projecting optical fiber group and a light receiving optical fiber group included in the confocal optical system-based measurement apparatus according to an embodiment of the present invention.

FIG. 10 illustrates a method for manufacturing a light projecting optical fiber group and a light receiving optical fiber group included in the confocal optical system-based measurement apparatus according to an embodiment of the present invention.

Figure 11:
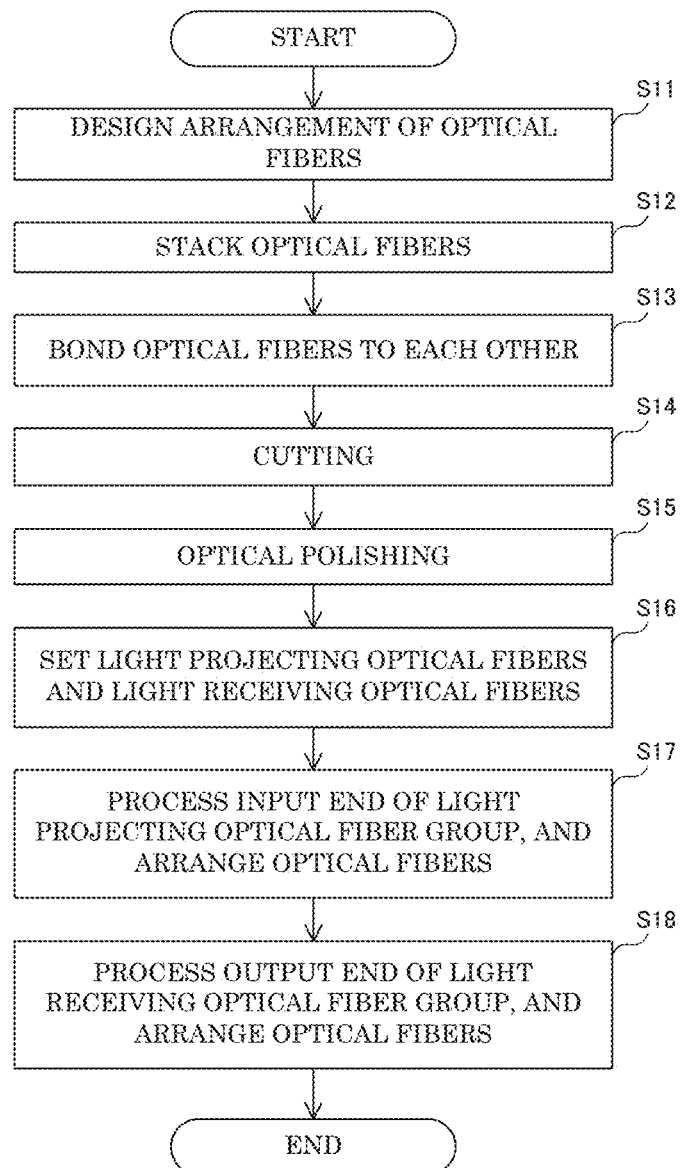
FIG. 11 is a flowchart defining an example of a series of procedures of the method for manufacturing the light projecting optical fiber group and the light receiving optical fiber group included in the confocal optical system-based measurement apparatus according to an embodiment of the present invention.

FIG. 11 is a flowchart defining an example of a series of procedures of the method for manufacturing the light projecting optical fiber group and the light receiving optical fiber group included in the confocal optical system-based measurement apparatus according to an embodiment of the present invention.

As shown in FIGS. 10 and 11, first, an operator designs the arrangement of a plurality of optical fibers 50, considering the type of the sample 61, what is to be measured, and so on (step S11).

Next, the operator stacks the plurality of optical fibers 50, from each of which the buffer 50d and the secondary coating 50e shown in FIG. 9 have been removed, in the designed arrangement as shown at the top of FIG. 10, for example. That is to say, the operator arranges the plurality of optical fiber 50 according to the design so as to be closer to each other than in a state in which the optical fibers 50 are arranged in contact with each other in a square lattice, for example (step S12).

Next, the operator bonds the plurality of optical fibers 50 thus arranged, to each other (step S13).

Next, as shown in the middle of FIG. 10, the operator cuts the plurality of optical fibers 50 thus bonded to each other, at midpoints of the optical fibers 50 in a direction in which the optical fibers 50 extend, along a plane that is orthogonal to the direction, and thus the operator divides the optical fibers 50 into the light projecting optical fiber group 121 and the light receiving optical fiber group 122. At this time, the operator determines a cutting position such that the length of the light projecting optical fiber group 121 in the direction in which the light projecting optical fiber group 121 extends is no less than a length that is required for the light projecting optical fibers 12, and the length of the light receiving optical fiber group 122 in the direction in which the light receiving optical fiber group 122 extends is no less than a length that is required for the light receiving optical fibers 22, and then cuts the optical fibers 50 (step S14).

Next, the operator performs optical polishing on the cut section of the light projecting optical fiber group 121 and the cut section of the light receiving optical fiber group 122 (step S15).

Next, as shown at the bottom of FIG. 10, the operator sets the optical fibers 50 included in the light projecting optical fiber group 121 as the light projecting optical fibers 12 or the light projecting marker optical fibers 15, and sets the optical fibers 50 included in the light receiving optical fiber group 122 as the light receiving optical fibers 22 or the light receiving marker optical fibers 25 (step S16).

Specifically, if 25 optical fibers 50 are respectively assigned No. 1 to No. 25, for example, optical fiber 50 No. 1 can be divided into light projecting marker optical fiber 15 No. 1 and light receiving marker optical fiber 25 No. 1, and optical fibers 50 Nos. 2 to 25 can be respectively divided into light projecting optical fibers 12 Nos. 2 to 25 and light receiving optical fibers 22 Nos. 2 to 25. In this way by dividing a pair of cut optical fibers 50, which have been cut from one optical fiber 50, into a light projecting marker optical fiber 15 and a light receiving marker optical fiber 25 or a light projecting optical fiber 12 and a light receiving optical fiber 22, it is possible to manufacture a light projecting optical fiber group 121 and a light receiving optical fiber group 122 in which the end faces of the optical fibers that correspond to each other are in a mirror image relationship, and the shape of the end face of the light projecting optical fiber group 121 and the shape of the end face of the light receiving optical fiber group 122 are in a mirror image relationship.

Next, the operator processes end portions, which are on the opposite side to the cut sections, of the light projecting optical fibers 12 and the light projecting marker optical fibers 15 included in the light projecting optical fiber group 121, i.e., the input ends of the light projecting optical fibers 12 and the light projecting marker optical fibers 15. For example, the operator performs processing to remove the primary coating 12c of the input end of each light projecting optical fiber 12, and the primary coating 15c of the input end of each light projecting marker optical fiber 15. Thereafter, the operator divides the input end side of the light projecting optical fibers 12 and the light projecting marker optical fibers 15, which have been processed, into a plurality of sets P1, and arranges them, as described below, for example (step S17).

Next, the operator processes end portions, which are on the opposite side to the cut sections, of the light receiving optical fibers 22 and the light receiving marker optical fibers 25 included in the light receiving optical fiber group 122, i.e., the output ends of the light receiving optical fibers 22 and the light receiving marker optical fibers 25. For example, the operator performs processing to remove the primary coating 22c of the output end of each light receiving optical fiber 22, and the primary coating 25c of the output end of each light receiving marker optical fiber 25. Thereafter, the operator divides the output end side of the light receiving optical fibers 22 and the light receiving marker optical fibers 25, which have been processed, into a plurality of sets P2, and arranges them, as described below, for example (step S18).

As a result of manufacturing the light projecting optical fiber group 121 and the light receiving optical fiber group 122 in such a manner, the shape of the light projecting end face Eps and the shape of the light receiving end face Ers are in a mirror image relationship, and, in the light projecting optical fiber group 121 and the light receiving optical fiber group 122, the shape of the end face Epb of each light projecting optical fiber 12 and the shape of the end face Erb of the light receiving optical fiber 22 corresponding thereto are in a mirror image relationship. As a result, regardless of the number of optical fibers, it is possible to accurately match the condensing positions at which beams from the condensing points on the sample 61 are condensed, with the central positions of the cores 22a of the light receiving optical fibers 22.

As a result, each light receiving optical fiber 22 can desirably receive light from the real image RIp corresponding thereto. Also, for example, there is no need to provide a pinhole array it is possible to realize a simple configuration, and keep costs low.

Also, there is no need to form the cores 22a of the light receiving optical fibers 22 so as to have a diameter that is larger than the diameter of the cores 12a of the light projecting optical fibers 12, and it is possible to improve light receiving properties, and realize a simpler manufacturing process.

Also, in the light projecting optical fiber group 121 and the light receiving optical fiber group 122, the end face Epm of each light projecting marker optical fiber 15 and the end face Erm of the light receiving marker optical fiber 25 corresponding thereto are in a mirror image relationship. As a result, it is possible to easily find a relationship between condensing positions at which marker beams from the light projecting marker optical fibers 15 are condensed and condensing positions at which marker beams from the light receiving marker optical fibers 25 are condensed.

Example of Arrangement of Input End of Light Projecting Optical Fiber Group

If the input ends of the plurality of light projecting optical fibers 12 included in the light projecting optical fiber group 121 are divided into a plurality of sets P1, the light projecting portion 6 includes a plurality of measurement light sources 11, for example. The plurality of measurement light sources 11 are respectively associated with the plurality of sets P1.

In this case, the input end of each of one or more light projecting optical fibers 12 included in the same set is placed in a cylinder that is made of a material that contains stainless steel or the like, and the inside of the cylinder is irradiated with light from the measurement light source 11 corresponding thereto, so that light from each measurement light source 11 hits the set P1 corresponding thereto. As a result, the optical path between a measurement light source 11 and the set P1 corresponding thereto is limited.

With such a configuration, it is possible to control an area that is to be irradiated with light from the measurement light sources 11, and condense light from one or more light projecting optical fibers 12 included in the light projecting optical fiber group 121 onto the sample 61.

EXAMPLE 1

Figure 12:
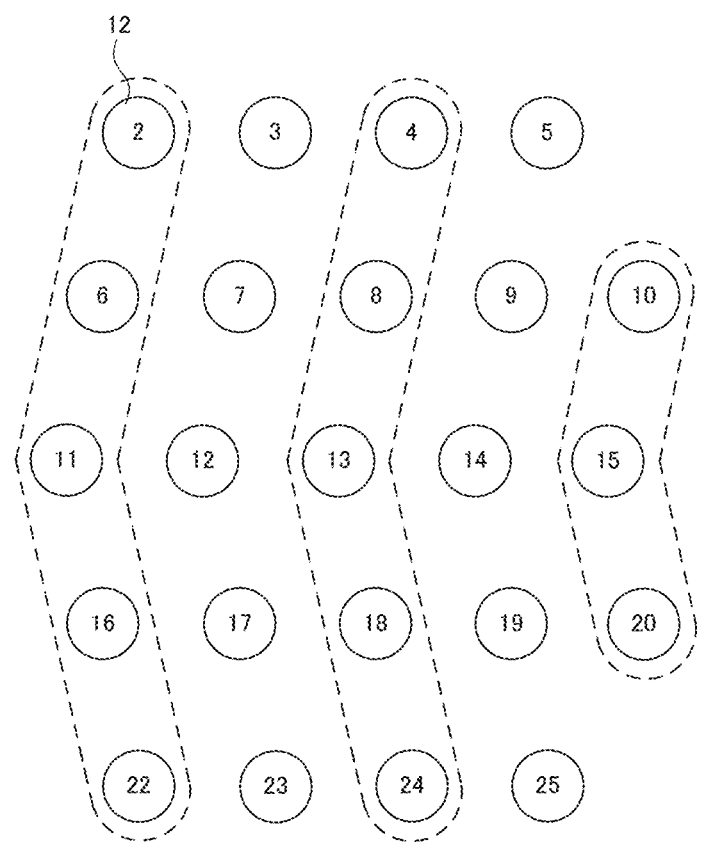
FIG. 12 shows an example of the grouping of the plurality of light projecting optical fibers included in the confocal optical system-based measurement apparatus according to an embodiment of the present invention.

FIG. 12 shows example of the grouping of the plurality of light projecting optical fibers included in the confocal optical system-based measurement apparatus according to an embodiment of the present invention. In this example, the cut optical fibers 50 Nos. 2 to 20 and 22 to 25 are light projecting optical fibers 12.

The light projecting portion 6 includes 23 measurement light sources 11, for example. An operator associates 23 light projecting optical fibers 12 with the 23 measurement light sources 11 in one-to-one correspondence, for example. That is to say 23 light projecting optical fibers 12 are divided into 23 sets P1, and each set P1 includes one light projecting optical fiber 12.

Figure 13:
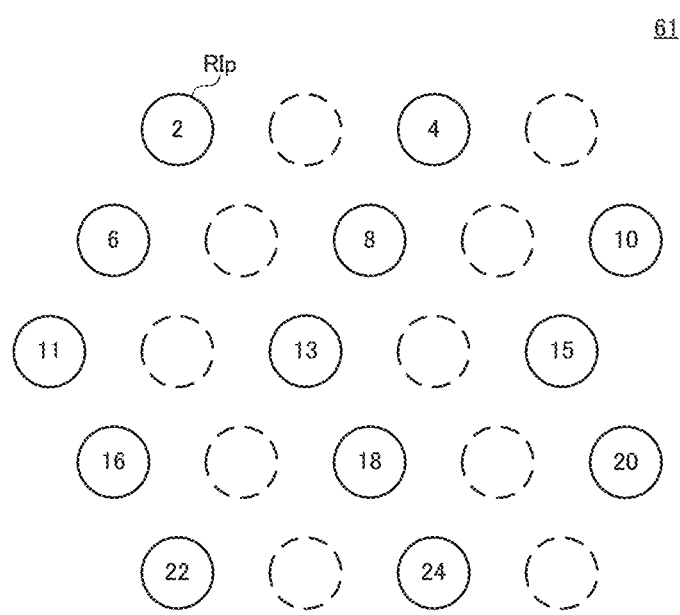
FIG. 13 shows an example of a set of real images formed on a sample by the confocal optical system-based measurement apparatus according to an embodiment of the present invention.

FIG. 13 shows an example of a set of real images formed on a sample by the confocal optical system-based measurement apparatus according to an embodiment of the present invention.

As shown in FIGS. 12 and 13, for example, 13 measurement light sources 11 corresponding to light projecting optical fibers 12 Nos. 2, 4, 6, 8, 10, 11, 13, 15, 16, 18, 20, 22, and 24 are turned ON, and the 10 other measurement light sources 11 are turned. OFF. In FIG. 12, the light projecting optical fibers 12 corresponding to the measurement light sources 11 that are to be turned ON are surrounded by dotted lines. In this case, the plurality of real images RIp formed on the sample 61 are those shown in FIG. 13. In FIG. 13, real images RIp corresponding to the measurement light sources 11 that are ON are represented by solid lines, and the positions of real images corresponding to the measurement light sources 11 that are not ON are represented by dotted lines.

Figure 14:
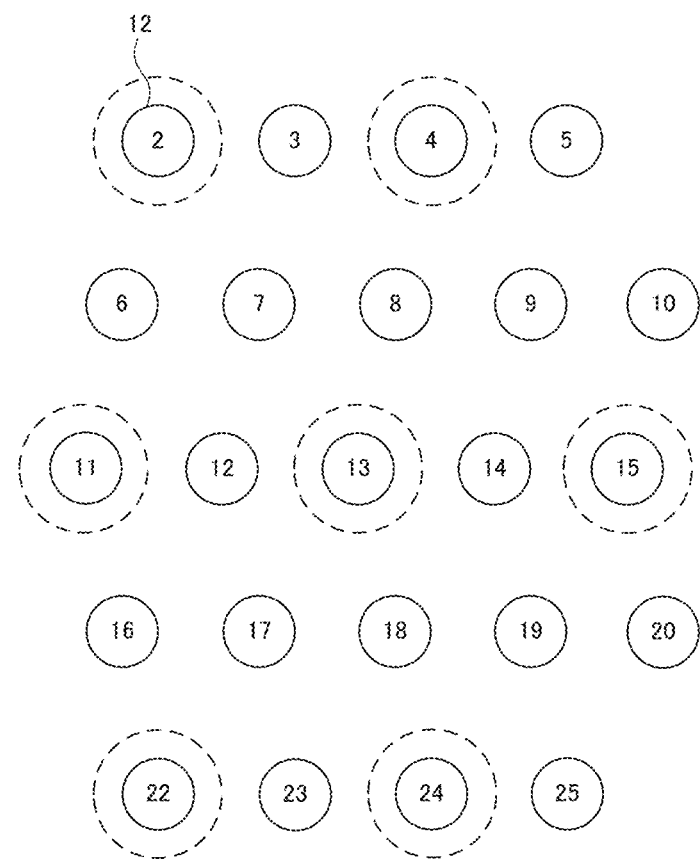
FIG. 14 shows an example of the grouping of the plurality of light projecting optical fibers included in the confocal optical system-based measurement apparatus according to an embodiment of the present invention.
Figure 15:
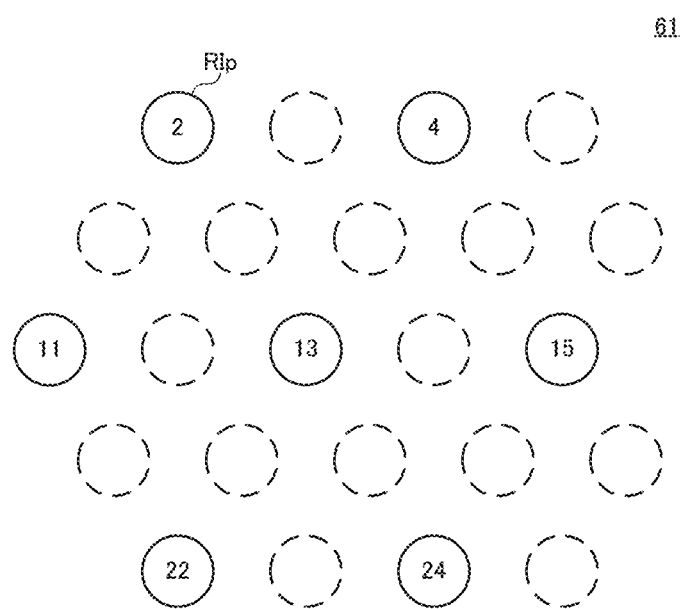
FIG. 15 shows an example of a set of real images formed on a sample by the confocal optical system-based measurement apparatus according to an embodiment of the present invention.

FIG. 14 shows an example of the grouping of the plurality of light projecting optical fibers included in the confocal optical system-based measurement apparatus according to an embodiment of the present invention. FIG. 15 shows an example of a set of real images formed on a sample by the confocal optical system-based measurement apparatus according to an embodiment of the present invention.

As shown in FIGS. 14 and 15, for example, seven measurement light sources 11 corresponding to light projecting optical fibers 12 Nos. 2, 4, 11, 13, 22, and 24 are turned ON, and the 16 other measurement light sources 11 are turned OFF. In FIG. 14, the light projecting optical fibers 12 corresponding to the measurement light sources 11 that are to be turned ON are surrounded by dotted lines. In this case, the plurality of real images RIp formed on the sample 61 are those shown in FIG. 15. In FIG. 15, real images RIp corresponding to the measurement light sources 11 that are ON are represented by solid lines, and the positions of real images corresponding to the measurement light sources 11 that are not ON are represented by dotted lines.

EXAMPLE 2

Figure 16:
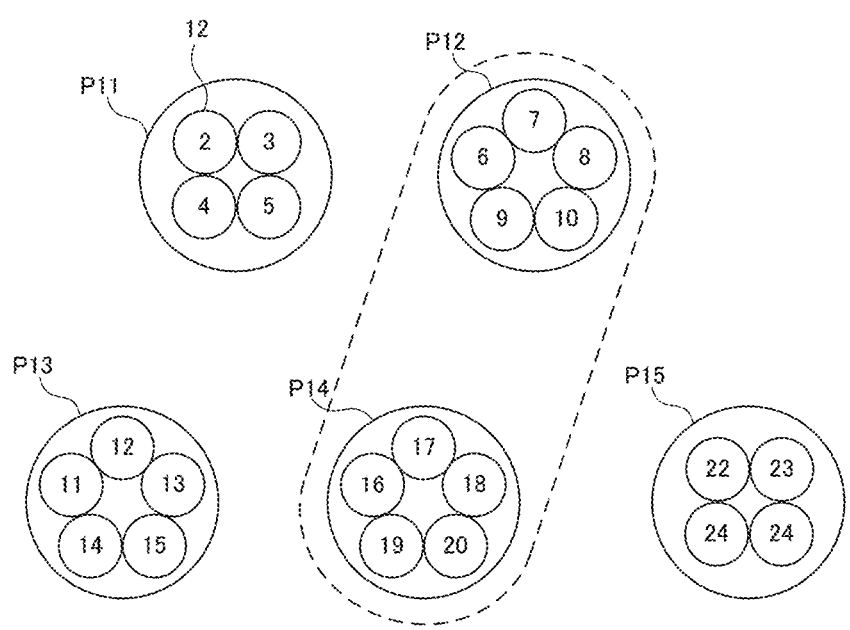
FIG. 16 shows an example of the grouping of the plurality of light projecting optical fibers included in the confocal optical system-based measurement apparatus according to an embodiment of the present invention.
Figure 17:
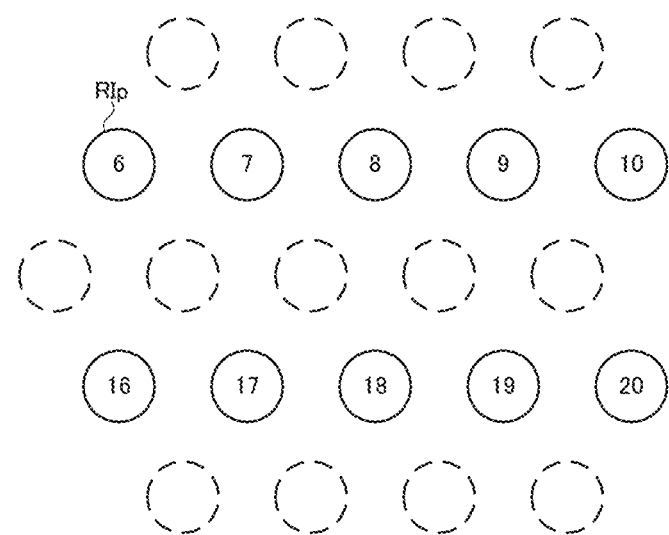
FIG. 17 shows an example of a set of real images formed on a sample by the confocal optical system-based measurement apparatus according to an embodiment of the present invention.

FIG. 16 shows an example of the grouping of the plurality of light projecting optical fibers included in the confocal optical system-based measurement apparatus according to an embodiment of the present invention. FIG. 17 shows an example of a set of real images formed on a sample by the confocal optical system-based measurement apparatus according to an embodiment of the present invention.

As shown in FIGS. 16 and 17, the light projecting portion 6 in this example includes five measurement light sources 11. Also, the operator divides 23 light projecting optical fibers 12 into five sets P1.

Specifically the operator divides 23 light projecting optical fibers 12 into a set P11 that includes four light projecting optical fibers 12 Nos. 2 to 5, a set P12 that includes five light projecting optical fibers 12 Nos, 6 to 10, a set P13 that includes five light projecting optical fibers 12 Nos, 11 to 15, a set P14 that includes five light projecting optical fibers 12 Nos. 16 to 20, and a set P15 that includes four light projecting optical fibers 12 Nos, 22 to 25, and houses the sets in the above-described cylinders, respectively.

For example, two measurement light sources 11 corresponding to the sets P12 and P14 are turned ON. In FIG. 16, the light projecting optical fibers 12 corresponding to the measurement light sources 11 that are to be turned ON are surrounded by dotted lines. In this case, the plurality of real images RIp formed on the sample 61 are those shown in FIG. 17. In FIG. 17 real images RIp corresponding to the measurement light sources 11 that are ON are represented by solid lines, and the positions of real images corresponding to the measurement light sources 11 that are not ON are represented by dotted lines.

Note that a configuration for controlling an area that is to be irradiated with light from each measurement light source 11 (i.e. for controlling each measurement light source 11 to irradiate or not irradiate the set P1 corresponding thereto with light therefrom) is not necessarily the configuration for switching the measurement light source 11 to ON or OFF. For example, it is possible to employ a configuration in which a shutter is provided between each measurement light source 11 and the input end(s) of one or more light projecting optical fibers 12 in the set P1 corresponding thereto, and the shutter is controlled so as to be open or closed, and thus an area that is to be irradiated with light from each measurement light source 11 is mechanically controlled (i.e. each measurement light source 11 is mechanically controlled so as to irradiate or not irradiate the set P1 corresponding thereto with light therefrom).

Example of Real Images RIp

EXAMPLE 1

Figure 18:
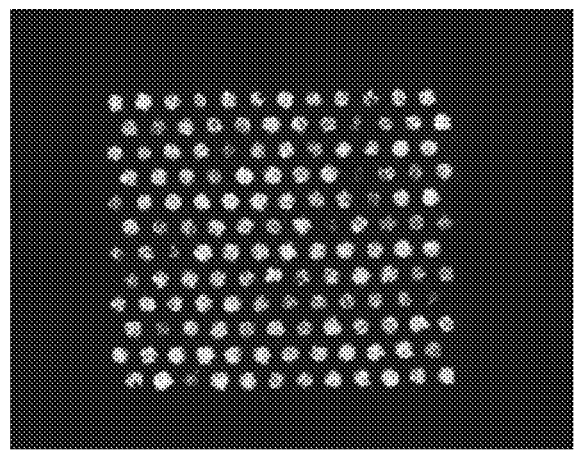
FIG. 18 is an image showing Example 1 of a set of real images formed by light from light projecting optical fibers, on a sample in the confocal optical system-based measurement apparatus according to an embodiment of the present invention.

FIG. 18 is an image showing Example 1 of a set of real images formed by light from light projecting optical fibers, on a sample in the confocal optical system-based measurement apparatus according to an embodiment of the present invention.

In this example, twelve layers each including twelve light projecting optical fibers 12 are arranged such that one optical fiber sits in the gap between the two optical fibers below. FIG. 18 shows real images RIp of the output ends of 144 light projecting optical fibers 12, formed as a result of light from the output ends being condensed on the sample 61 by the confocal optical system 5.

As shown in FIG. 18, for example, if all of the 144 light projecting optical fibers 12 are irradiated with light from the measurement light sources 11, 144 real images RIp respectively corresponding to 144 light projecting optical fibers 12 are formed on the sample 61.

EXAMPLE 2

Figure 19:
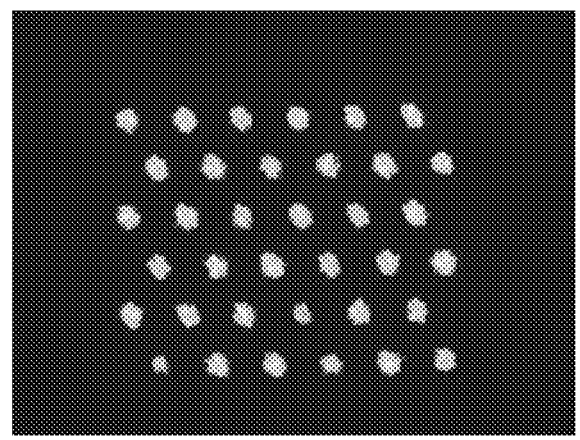
FIG. 19 is an image showing Example 2 of a set of real images formed by light from light projecting optical fibers, on a sample in the confocal optical system-based measurement apparatus according to an embodiment of the present invention.

FIG. 19 is an image showing Example 2 of a set of real images formed by light from light projecting optical fibers, on a sample in the confocal optical system-based measurement apparatus according to an embodiment of the present invention.

As shown in FIG. 19, for example, if, in one in every two layers of the 12 layers, i.e. six layers, one in every two light projecting optical fibers 12 in each layer, i.e. six light projecting optical fibers 12, are irradiated with light by controlling an area that is to be irradiated with light from the measurement light sources 11, 36 real images RIp corresponding to the 36 light projecting optical fibers 12 are formed on the sample 61.

EXAMPLE 3

Figure 20:
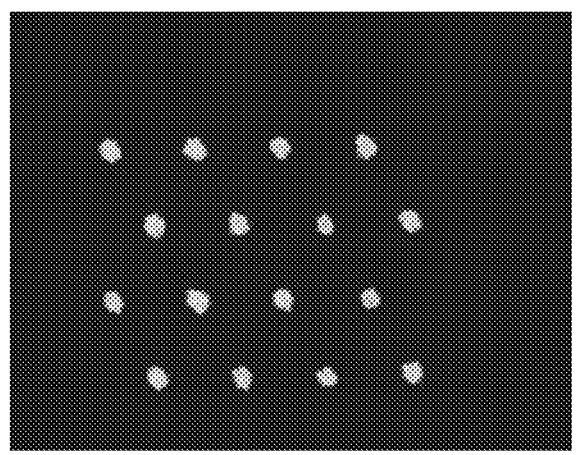
FIG. 20 is an image showing Example 3 of a set of real images formed by light from light projecting optical fibers, on a sample in the confocal optical system-based measurement apparatus according to an embodiment of the present invention.

FIG. 20 is an image showing Example 3 of a set of real images formed by light from light projecting optical fibers, on a sample in the confocal optical system-based measurement apparatus according to an embodiment of the present invention.

As shown in FIG. 20, for example, if, in one in every three layers of the 12 layers, i.e. four layers, one in every three light projecting optical fibers 12 in each layer, i.e. four light projecting optical fibers 12, are irradiated with light by controlling an area that is to be irradiated with light from the measurement light sources 11, 16 real images RIp corresponding to the 16 light projecting optical fibers 12 are formed on the sample 61.

EXAMPLE 4

Figure 21:
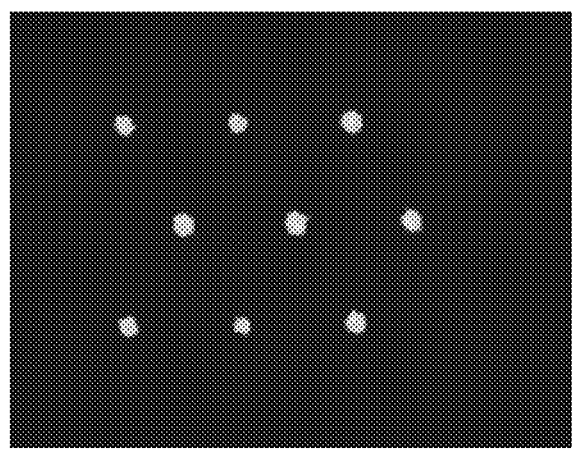
FIG. 21 is an image showing Example 4 of a set of real images formed by light from light projecting optical fibers, on a sample in the confocal optical system-based measurement apparatus according to an embodiment of the present invention.

FIG. 21 is an image showing Example 4 of a set of real images formed by light from light projecting optical fibers, on a sample in the confocal optical system-based measurement apparatus according to an embodiment of the present invention.

As shown in FIG. 21, for example, if, in one in every four layers of the 12 layers, i.e. three layers, one in every four light projecting optical fibers 12 in each layer, i.e. three light projecting optical fibers 12, are irradiated with light by controlling an area that is to be irradiated with light from the measurement light sources 11, nine real images RIp corresponding to the nine light projecting optical fibers 12 are formed on the sample 61.

EXAMPLE 5

Figure 22:
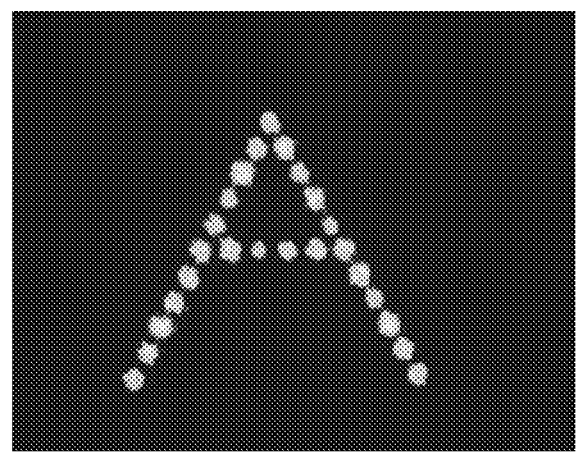
FIG. 22 is an image showing Example 5 of a set of real images formed by light from light projecting optical fibers, on a sample in the confocal optical system-based measurement apparatus according to an embodiment of the present invention.

FIG. 22 is an image showing Example 5 of a set of real images formed by light from light projecting optical fibers, on a sample in the confocal optical system-based measurement apparatus according to an embodiment of the present invention.

As shown in FIG. 22, for example, by controlling an area that is to be irradiated with light from the measurement light sources 11, any one or more light projecting optical fibers 12 of 144 light projecting optical fibers 12 are irradiated with light, and thus a plurality of actual images RIp that have the shape of any shape overall, such as the shape of the letter "A" in the alphabet, can be formed on the sample 61.

Although the microspectroscope 101 according to the embodiment of the present invention is configured such that the light projecting optical fiber group 121 includes one or more light projecting marker optical fibers 15, the present invention is not limited to such a configuration, and the light projecting optical fiber group 121 may include no light projecting marker optical fibers 15.

Although the microspectroscope 101 according to the embodiment of the present invention is configured such that the light receiving optical fiber group 122 includes one or more light receiving marker optical fibers 25, the present invention is not limited to such a configuration, and the light receiving optical fiber group 122 may include no light receiving marker optical fibers 25.

Also, the present invention is not limited to a configuration in which optical fibers included in the light projecting optical fiber group 121 are arranged closer to each other than in a state in which the optical fibers are arranged in contact with each other in a square lattice in a plan view in a direction toward the end faces Ep. The optical fibers included in the light projecting optical fiber group 121 may be arranged in any manner such as in a in a square lattice.

Also, the present invention is not limited to a configuration in which optical fibers included in the light receiving optical fiber group 122 are arranged closer to each other than in a state in which the optical fibers are arranged in contact with each other in a square lattice in a plan view in a direction toward the end faces Er. The optical fibers included in the light receiving optical fiber group 122 may be arranged in any manner such as in a in a square lattice.

Modifications

The light projecting optical fiber group 121 may further include one or more light projecting-side dummy fibers 16. The one or more light projecting-side dummy fibers 16 are, for example, located on the central side relative to at least one of the plurality of light projecting optical fibers 12 in the light projecting end face Eps.

If the light projecting optical fiber group 121 includes one or more light projecting-side dummy fibers 16, the light receiving optical fiber group 122 includes one or more light receiving-side dummy fibers 26 as with the light projecting optical fiber group 121.

The optical fibers and the dummy fibers are arranged such that the shape of the light projecting end face Eps of the light projecting optical fiber group 121 including one or more light projecting-side dummy fibers 16 and the shape of the light receiving end face liars of the light receiving optical fiber group 122 including one or more light receiving-side dummy fibers 26 are in a mirror image relationship.

In the light projecting optical fiber group 121 and the light receiving optical fiber group 122, for example, the shape of the end face of each light projecting-side dummy fiber 16 and the shape of the end face of the light receiving-side dummy fiber 26 corresponding thereto are in a mirror image relationship. Here, for example, the shape of the end face of each light projecting-side dummy fiber 16 and the shape of the end face of the light receiving-side dummy fiber 26 corresponding thereto are the same.

Furthermore, the cross-sections of the light projecting-side dummy fibers 16 and the light receiving-side dummy fibers 26 are, for example, in the shape of circles. Note that the cross-sections of the light projecting-side dummy fibers 16 and the light receiving-side dummy fibers 26 do not necessarily have to be in the shape of circles, and may be in the shape of polygons. The light projecting-side dummy fibers 16 are, for example, two-dimensionally arranged. The light receiving-side dummy fibers 26 are, for example, two-dimensionally arranged.

More specifically when the light projecting optical fibers 12 and the light receiving optical fibers 22 are to be manufactured, a plurality of optical fibers 50 and one or more dummy fibers are arranged such that, in a cross section of the optical fibers 50 along a plane that is orthogonal to a direction in which the optical fibers 50 extend, the optical fibers 50 and the dummy fibers are arranged closer to each other than in a state in which they are arranged in contact with each other in a square lattice, for example (step S12 in FIG. 11).

Thereafter, the plurality of optical fibers 50 and the one or more dummy fibers thus arranged are cut along the above-described plane so as to be divided into the light projecting optical fiber group 121 and the light receiving optical fiber group 122 (step S14 in FIG. 11).

Then, the dummy fibers included in the light projecting optical fiber group 121 are set as the light projecting-side dummy fibers 16, and the dummy fibers included in the light receiving optical fiber group 122 are set as the light receiving-side dummy fibers 26 (step S16 in FIG. 11).

As a result, the shape of the light projecting end face Eps and the shape of the light receiving end face Ers are in a mirror image relationship, and, in the light projecting optical fiber group 121 and the light receiving optical fiber group 122, the shape of each light projecting-side dummy fiber 16 and the shape of the light receiving-side dummy fiber 26 corresponding thereto are in a mirror image relationship.

EXAMPLE 1

Figure 23:
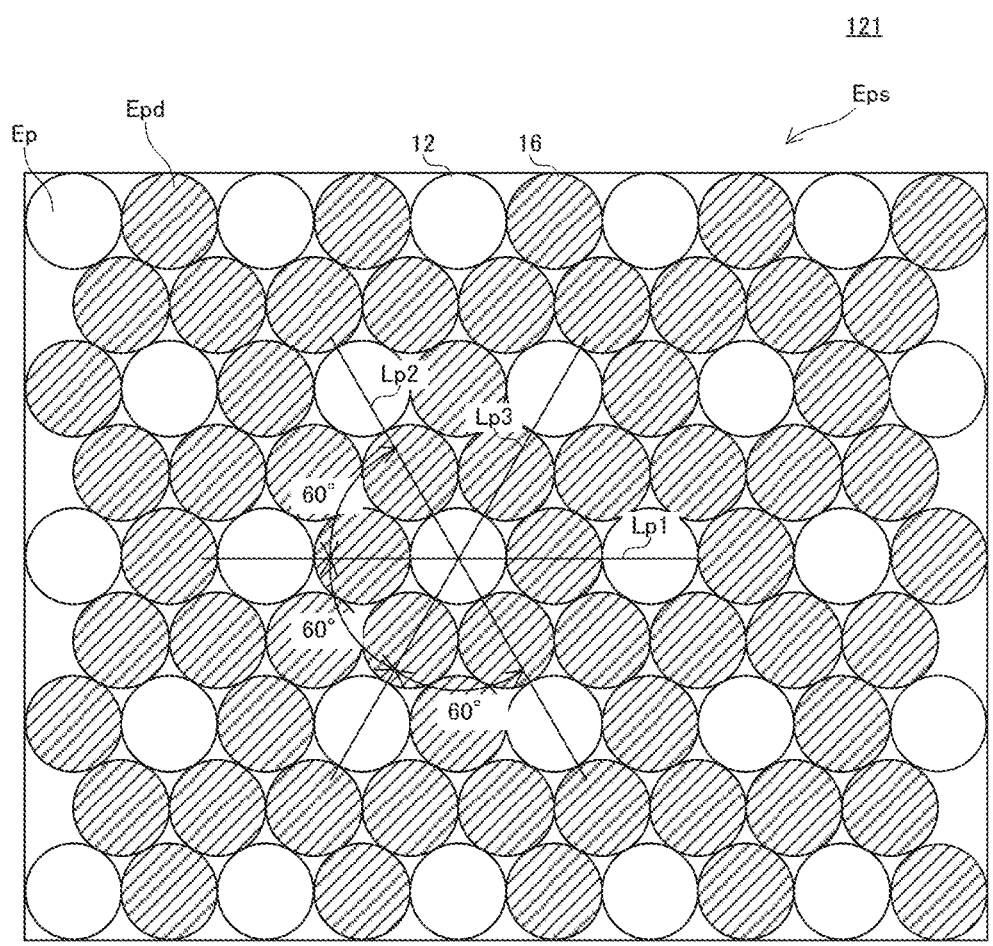
FIG. 23 shows Example 1 of the light projecting end face of the light projecting optical fiber group included in the confocal optical system-based measurement apparatus according to an embodiment of the present invention.

FIG. 23 shows Example 1 of the light projecting end face of the light projecting optical fiber group included in the confocal optical system-based measurement apparatus according to an embodiment of the present invention.

This example shows the end faces Ep of the output ends of 25 light projecting optical fibers 12 and end faces Epd of the output ends of a plurality of light projecting-side dummy fibers 16, in a plan view in a direction toward the end faces Ep.

As shown in FIG. 23, for example, the outer diameter of the light projecting-side dummy fibers 16 is the same as the outer diameter of the light projecting optical fibers 12, which is the outer diameter of the primary coatings 12c of the light projecting optical fibers 12. In a plan view in a direction toward the end faces Ep, the light projecting optical fibers 12 and the light projecting-side dummy fibers 16 are arranged closer to each other than in a state in which they are arranged in contact with each other in a square lattice.

For example, the 25 light projecting optical fibers 12 are arranged with a gap between each other such that each light projecting optical fiber 12 is in contact with a plurality of light projecting-side dummy fibers 16.

EXAMPLE 2

Figure 24:
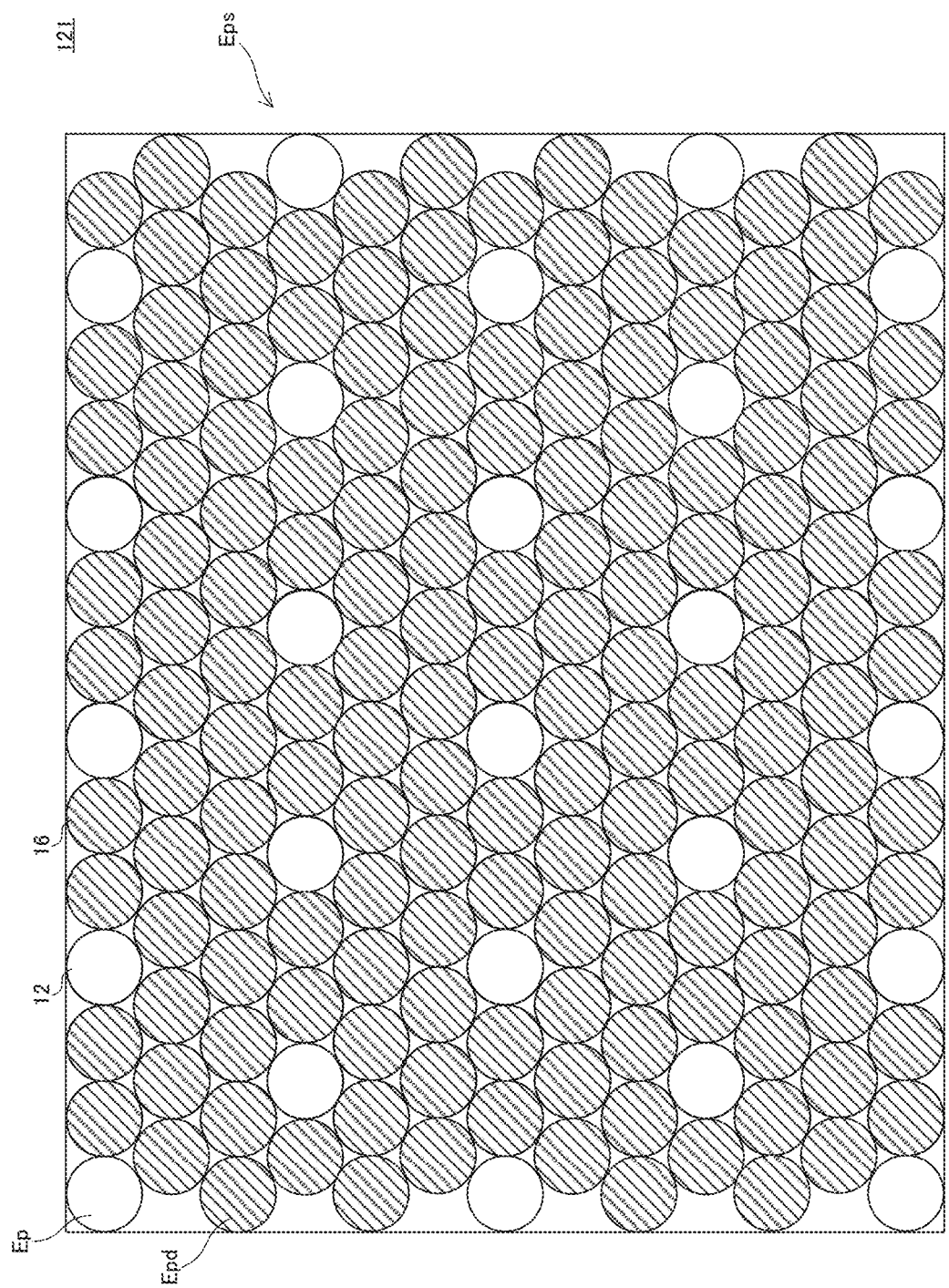
FIG. 24 shows Example 2 of the light projecting end face of the light projecting optical fiber group included in the confocal optical system-based measurement apparatus according to an embodiment of the present invention.

FIG. 24 shows Example 2 of the light projecting end face of the light projecting optical fiber group included in the confocal optical system-based measurement apparatus according to an embodiment of the present invention.

As shown in FIG. 24, for example, compared to the 25 light projecting optical fibers 12 shown in FIG. 23, the 25 light projecting optical fibers 12 are arranged with a greater gap between each other such that each light projecting optical fiber 12 is in contact with a plurality of light projecting-side dummy fibers 16.

EXAMPLE 3

Figure 25:
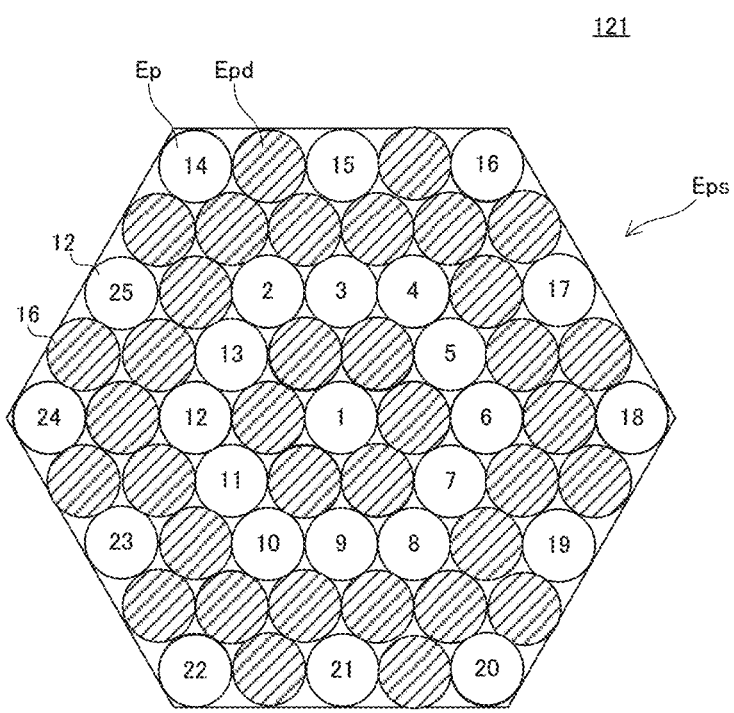
FIG. 25 shows Example 3 of the light projecting end face of the light projecting optical fiber group included in the confocal optical system-based measurement apparatus according to an embodiment of the present invention.

FIG. 25 shows Example 3 of the light projecting end face of the light projecting optical fiber group included in the confocal optical system-based measurement apparatus according to an embodiment of the present invention.

As shown in FIG. 25, for example, light projecting optical fiber 12 No. 1 is arranged so as to be in contact with six light projecting-side dummy fibers 16, and 12 light projecting optical fibers 12 Nos. 2 to 13 are arranged in the shape of a hexagon so as to surround the six light projecting-side dummy fibers 16.

Also, 18 dummy fibers are arranged in the shape of a hexagon so as to surround 12 light projecting optical fibers 12 Nos. 2 to 13. Also, 12 light projecting optical fibers 12 Nos. 14 to 25 and 12 light projecting-side dummy fibers 16 are arranged one after the other so as to surround the 18 dummy fibers.

EXAMPLE 4

Figure 26:
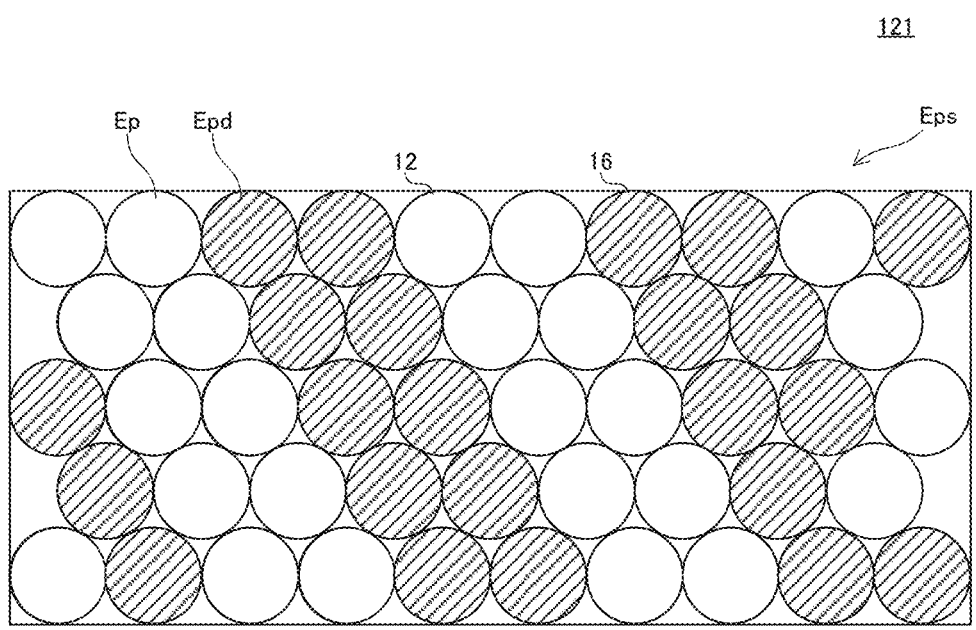
FIG. 26 shows Example 4 of the light projecting end face of the light projecting optical fiber group included in the confocal optical system-based measurement apparatus according to an embodiment of the present invention.

FIG. 26 shows Example 4 of the light projecting end face of the light projecting optical fiber group included in the confocal optical system-based measurement apparatus according to an embodiment of the present invention.

As shown in FIG. 26, for example, 25 light projecting optical fibers 12 and 23 light projecting-side dummy fibers 16 are mainly arranged such that a pair of two light projecting optical fibers 12 and a pair of two light projecting-side dummy fibers 16 are arranged one after the other in each row.

As shown in Examples 1 to 4, it is possible to arrange each of a plurality of light projecting optical fibers 12 at any position in the light projecting end face Eps by using the light projecting-side dummy fibers 16. As a result, for example, it is possible to arrange a plurality of light projecting optical fibers 12 with a gap between each other, and it is possible to perform measurement on a large area on the sample 61 using a small number of light projecting optical fibers 12.

Also, by using the light receiving-side dummy fibers 26, for example, it is possible to arrange a plurality of light receiving optical fibers 22 with a gap between each other in the light receiving end face Ers, for example. Therefore, it is possible to suppress the influence on the light receiving optical fibers 22, of light from other condensing points on the sample 61.

Also, as described above, even if each of the light projecting-side dummy fibers 16 and each of the light receiving-side dummy fibers 26 are arranged at any position, a configuration in which the shape of the light projecting end face Eps and the shape of the light receiving end face Ers are in a mirror image relationship is maintained. As a result, it is possible to accurately match the condensing positions at which beams from the condensing points on the sample 61 are condensed, with the central positions of the cores 22a of the light receiving optical fibers 22.

Measuring Method

Figure 27:
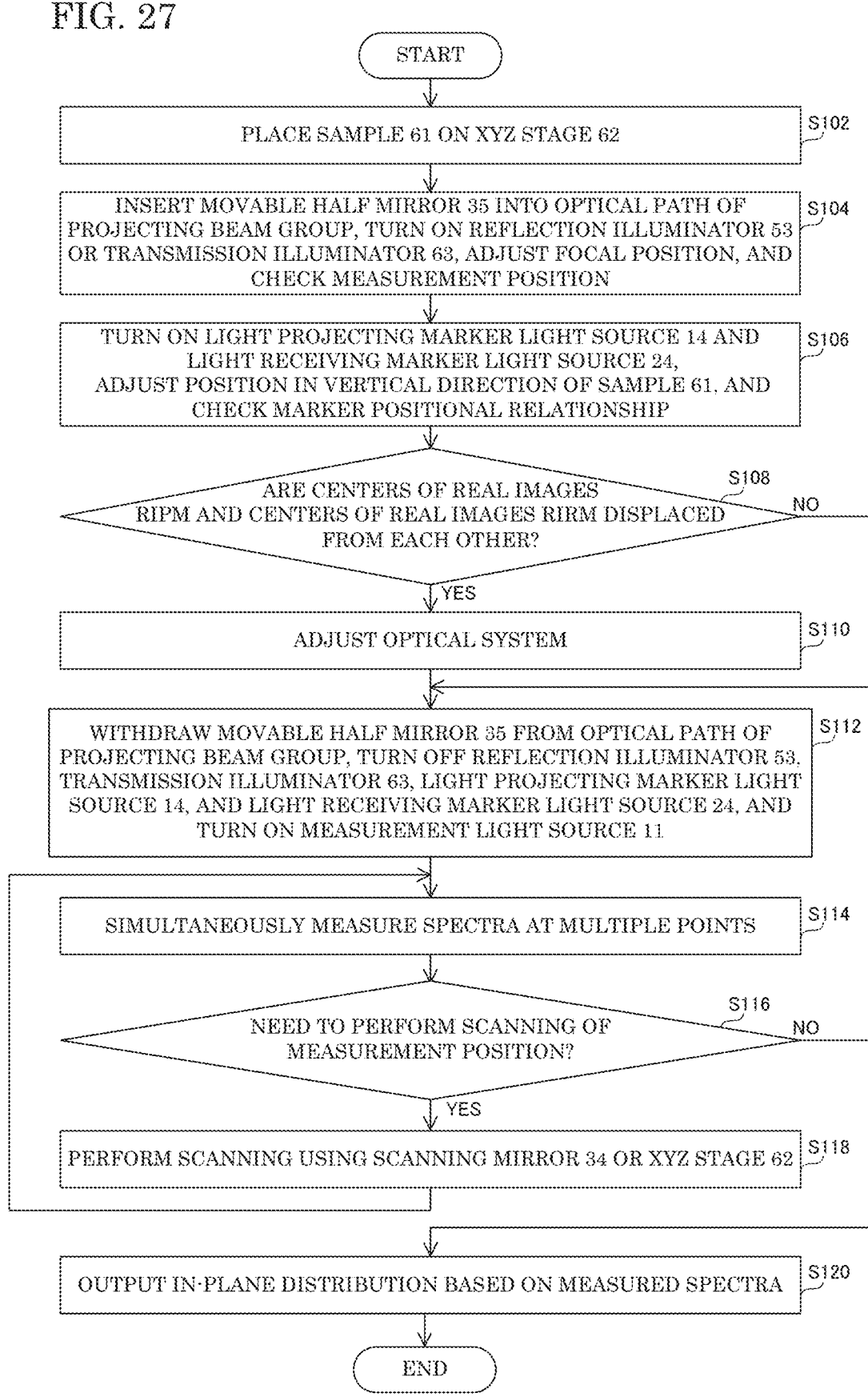
FIG. 27 is a flowchart defining an example of the procedure of a measuring method using the confocal optical system-based measurement apparatus according to an embodiment of the present invention.

FIG. 27 is a flowchart defining an example of the procedure of a measuring method using the confocal optical system-based measurement apparatus according to an embodiment of the present invention.

As shown in FIGS. 1 and 27, first, the measurer places the sample 61 on the XYZ stage 62 (step S102).

Next, the measurer inserts the movable half mirror 35 into the optical path of the projecting beam group, turns on the reflection illuminator 53 or the transmission illuminator 63, adjusts the focal position, and checks the measurement position (step S104).

Next, the measurer turns on the light projecting marker light source 14 and the light receiving marker light source 24, adjusts the positions in the vertical direction of the real images RIrm and RIpm on the sample 61, and checks the positional relationship between the centers of the real images RIpm and the centers of the real images RIrm, that is, the marker positional relationship (step S106).

Next, if the centers of the real images RIpm and the centers of the real images RIrm are displaced from each other (YES in step S108), in order to solve the displacement, the measurer adjusts the positions and the orientations of the optical elements in the confocal optical system 5, the light projecting-side two-dimensional array fixing portion 13, and the light receiving-side two-dimensional array fixing portion 23 (step S110).

Next, if the measurer sees that the centers of the real images RIpm and the centers of the real images RIrm are not displaced from each other (NO in step S108) or the optical system has been adjusted (step S110), the measurer withdraws the movable half mirror 35 from the optical path of the projecting beam group, turns off the reflection illuminator 53, the transmission illuminator 63, the light projecting marker light source 14, and the light receiving marker light source 24, and turns on the measurement light source 11 (step S112).

Next, the measurer simultaneously measures spectra at multiple points (step S114).

Next, if scanning of the measurement position is necessary (YES in step S116), the measurer rotates the scanning mirror 34 or laterally moves the XYZ stage 62 (step S118).

Next, the measurer simultaneously measures spectra at multiple points after the scanning (step S114).

On the other hand, if scanning of the measurement position is not necessary or is ended (NO in step S116), the measurer calculates the spectral characteristic amount at each position based on the measured spectrum, and generates and outputs in-plane distribution of the calculated characteristic amount (step S120). Note that the spectral characteristic amount is, for example, the magnitude of a Raman shift, the intensity of a peak, the transmittance, the reflectance, the chromaticity or the like.

Note that, in this specification, "simultaneously measuring spectra at multiple points" may refer to performing parallel measurement of spectra at multiple points.

Although the microspectroscope 101 according to the embodiment of the present invention is configured such that the optical fibers included in the light projecting optical fiber group 121 and the optical fibers included in the light receiving optical fiber group 122 are individually two-dimensionally arranged, the present invention is not limited to such a configuration. The optical fibers included in the light projecting optical fiber group 121 and the optical fibers included in the light receiving optical fiber group 122 may be individually one-dimensionally arranged.

Although the microspectroscope 101 according to the embodiment of the present invention includes a plurality of light projecting marker optical fibers 15, the present invention is not limited to such a configuration. The microspectroscope 101 may include one light projecting marker optical fiber 15.

Although the microspectroscope 101 according to the embodiment of the present invention includes a plurality of light receiving marker optical fibers 25, the present invention is not limited to such a configuration. The microspectroscope 101 may include one light receiving marker optical fiber 25.

For example, in the configuration in which the microspectroscope 101 includes one light projecting marker optical fiber 15 and one light receiving marker optical fiber 25, if the core 15a of the light projecting marker optical fiber 15 and the core 25a of the light receiving marker optical fibers 25 have a shape such as a quadrangle whose angles can be identified, a relationship between the center positions of the input ends of the cores 22a of the light receiving optical fibers 22 and the condensing positions of light from the centers of the real images RIp on the input ends can be seen. Accordingly the optical system can be easily adjusted.

Although the microspectroscope 101 according to the embodiment of the present invention includes the light projecting optical fibers 12, the light projecting marker optical fibers 15 and the light projecting-side dummy fibers 16, the present invention is not limited to such a configuration. The microspectroscope 101 may not include at least either the light projecting marker optical fibers 15 or the light projecting-side dummy fibers 16.

Although the microspectroscope 101 according to the embodiment of the present invention includes the light receiving optical fibers 22, the light receiving marker optical fibers 25, and the light receiving-side dummy fibers 26, the present invention is not limited to such a configuration. The microspectroscope 101 may not include at least either the light receiving marker optical fibers 25 or the light receiving-side dummy fibers 26.

For example, in the configuration in which the microspectroscope 101 does not include the light receiving marker optical fibers 25, if the light receiving optical fibers 22 are detached from the spectroscope 1 and light is irradiated onto the output ends of the light receiving optical fibers 22, or light is irradiated from the diffraction grating 1b side of the slit 1a toward the output ends of the light receiving optical fibers 22, real images RIr of the cores 22a of the 23 light receiving optical fibers 22 are generated on the sample 61. Furthermore, if the measurement light source 11 is turned on, the real images RIp are generated on the sample 61. When the real images RIr and RIp are used, a relationship between the center positions of the input ends of the cores 22a of the light receiving optical fibers 22 and the condensing positions of light from the centers of the real images RIp on the input ends can be seen. Accordingly the optical system can be adjusted.

Also, the confocal optical system-based measurement apparatus according to the embodiment of the present invention is not limited to a microspectroscope, and may be another kind of measurement apparatus that uses a confocal optical system. For example, the confocal optical system-based measurement apparatus may have a configuration that is not provided with optical parts for acquiring an image in which the sample 61 is partially enlarged, such as the object lens 36 shown in FIG. 1.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A confocal optical system-based measurement apparatus comprising:
a light source;
a light projecting optical fiber group;
a light receiving optical fiber group;
a spectroscope; and
a confocal optical system configured to condense each of a plurality of beams from a plurality of light projecting optical fibers to irradiate a sample therewith, and cause a plurality of beams from a plurality of condensing points on the sample to form images on the plurality of light receiving optical fibers, respectively,
wherein the light projecting optical fiber group includes the plurality of light projecting optical fibers configured to receive light from the light source,
the light receiving optical fiber group includes the plurality of light receiving optical fibers configured to guide received light to the spectroscope,
the shape of an end face of the light projecting optical fiber group and the shape of an end face of the light receiving optical fiber group are in a mirror image relationship, and
in the light projecting optical fiber group and the light receiving optical fiber group, the shape of an end face of each light projecting optical fiber and the shape of an end face of a light receiving optical fiber corresponding thereto are in a mirror image relationship.

2. The confocal optical system-based measurement apparatus according to claim 1,
wherein each light projecting optical fiber and each light receiving optical fiber include
a core,
a clad that covers the outer circumferential surface of the core, and
a primary coating that covers the outer circumferential surface of the clad.

3. The confocal optical system-based measurement apparatus according to claim 1,
wherein the light projecting optical fiber group further includes one or more light projecting-side dummy fibers,
the light receiving optical fiber group further includes one or more light receiving-side dummy fibers,
the one or more light projecting-side dummy fibers are located on the central side relative to at least one of the plurality of light projecting optical fibers in the end face of the light projecting optical fiber group, and
the one or more light receiving-side dummy fibers are located on the central side relative to at least one of the plurality of light receiving optical fibers in the end face of the light receiving optical fiber group.

4. The confocal optical system-based measurement apparatus according to claim 1,
wherein the light projecting optical fiber group further includes one or more light projecting marker optical fibers,
the light receiving optical fiber group further includes one or more light receiving marker optical fibers,
the confocal optical system condenses a marker beam from each light projecting marker optical fiber and a marker beam from each light receiving marker optical fiber to irradiate the sample therewith, and
in the light projecting optical fiber group and the light receiving optical fiber group, the shape of an end face of each light projecting optical fiber and the shape of an end face of a light receiving optical fiber corresponding thereto are in a mirror image relationship.

5. A method for manufacturing a confocal optical system-based measurement apparatus that includes: a light source; a plurality of light projecting optical fibers configured to receive light from the light source; a spectroscope; a plurality of light receiving optical fibers configured to guide received light to the spectroscope; and a confocal optical system configured to condense each of a plurality of beams from the plurality of light projecting optical fibers to irradiate a sample therewith, and cause a plurality of beams from a plurality of condensing points on the sample to form images on the plurality of light receiving optical fibers, respectively the method comprising:

arranging optical fibers;
cutting the optical fibers thus arranged, along a plane that is orthogonal to a direction in which the optical fibers extend, to divide the optical fibers into two optical fiber groups; and
setting optical fibers included in one of the optical fiber groups as the light projecting optical fibers, and setting optical fibers included in the other of the optical fiber groups as the light receiving optical fibers.

\* \* \* \* \*